United States Patent [19]

Rajchman

[11] 4,360,251

[45] Nov. 23, 1982

[54] DISPLAY DEVICE AND METHOD UTILIZING PHASE GRATINGS

[76] Inventor: Jan A. Rajchman, 268 Edgerstoune Rd., Princeton, N.J. 08540

[21] Appl. No.: 90,662

[22] Filed: Nov. 2, 1979

[51] Int. Cl.³ .............................................. G02B 5/18
[52] U.S. Cl. ............................ 350/162.18; 350/162.2
[58] Field of Search ............ 350/162 R, 162 SF, 266, 350/272, 314; 340/763, 783; 358/56, 60

[56] References Cited

U.S. PATENT DOCUMENTS

| | | | |
|---|---|---|---|
| 3,777,633 | 12/1973 | Kirk | 350/162 SF X |
| 4,009,939 | 3/1977 | Okano | 350/162 SF |
| 4,062,628 | 12/1977 | Gale | 350/162 R |
| 4,083,627 | 4/1978 | Okano | 350/162 SF |
| 4,093,346 | 6/1978 | Nishmo et al. | 350/162 SF |

*Primary Examiner*—F. L. Evans
*Attorney, Agent, or Firm*—Milton S. Winters

[57] ABSTRACT

An array of picture elements is disclosed for providing a display having selectivitely light or dark areas. The array includes light valves each comprising a pair of light transmissive elements having facing phase gratings, preferably sinusoidal, of like periodicity and parallel grating lines. The pair of elements are selectively positioned in two positions. In the first position, (the relatively dark transmissive position) the maxima and minima of one of the light transmissive elements are respectively coincident with the maxima and minima of the other light transmissive element. In the second position, (the relatively dark transmissive position) the maxima and minima of one of the light transmissive elements are respectively coincident with the minima and maxima of the other light transmissive element. Preferably the gratings comprise two sets of gratings having lines at right angles to each other, and at 45° to the direction of motion which is used to position the two light transmissive elements from one selected position to the other. They alternatively may comprise three sets of lines at 60°. The two selected positions may be defined by stops. Alternatively, the two positions may be defined by grating facing, complementary complex wave forms. One of the grating lines of one pair of light transmissive elements may be embossed from the other element of the same pair.

The individual picture elements are defined by the intersections between rows and columns of the light transmissive elements. The rows employ piezoelectric elements, preferably using PVF$_2$, to lock in place all the picture elements of the rows of the array except, when desired, a selected row, which is free to move, in order to change relative positions of the elements. The columns employ bimorphs, also preferably using PVF$_2$.

43 Claims, 34 Drawing Figures

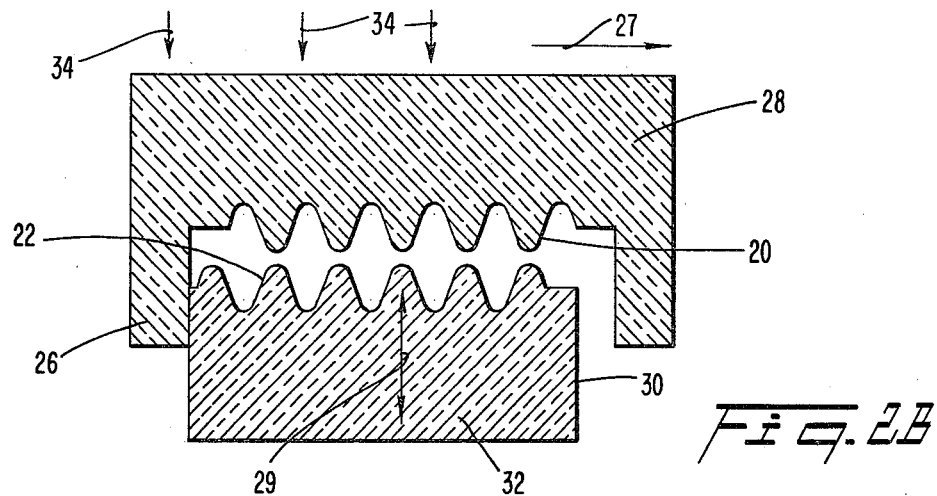
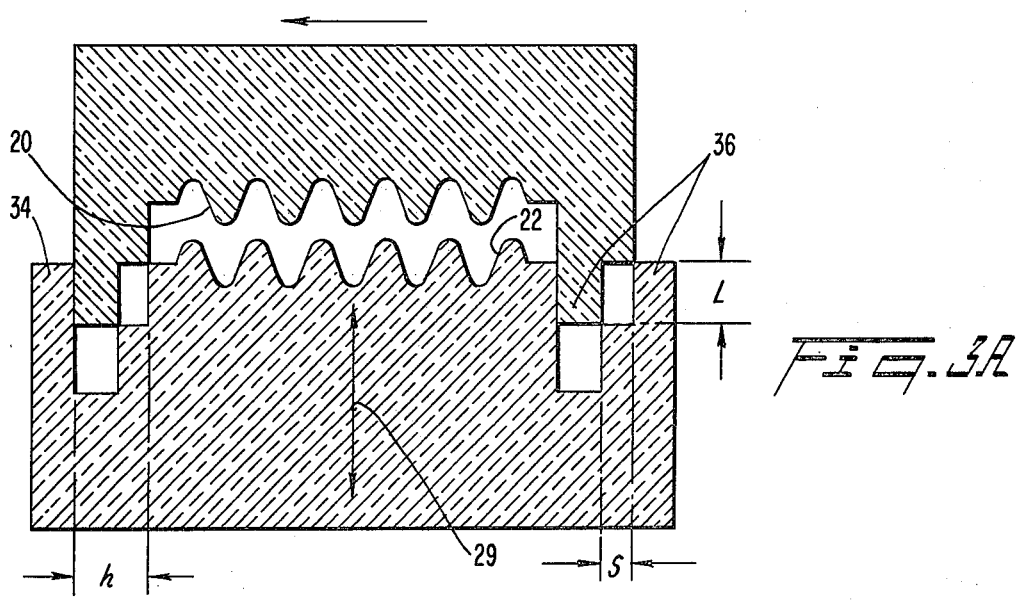
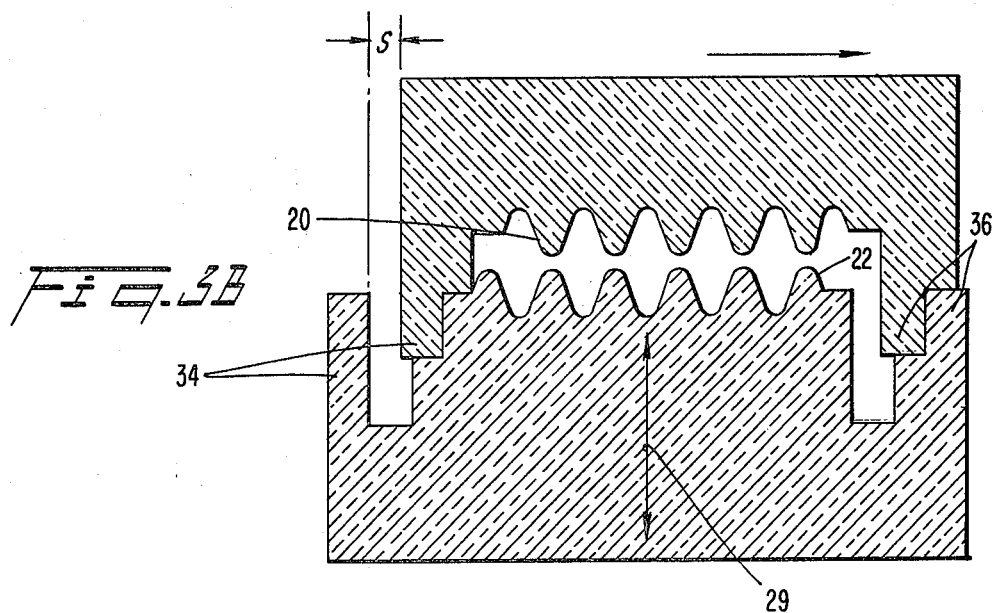

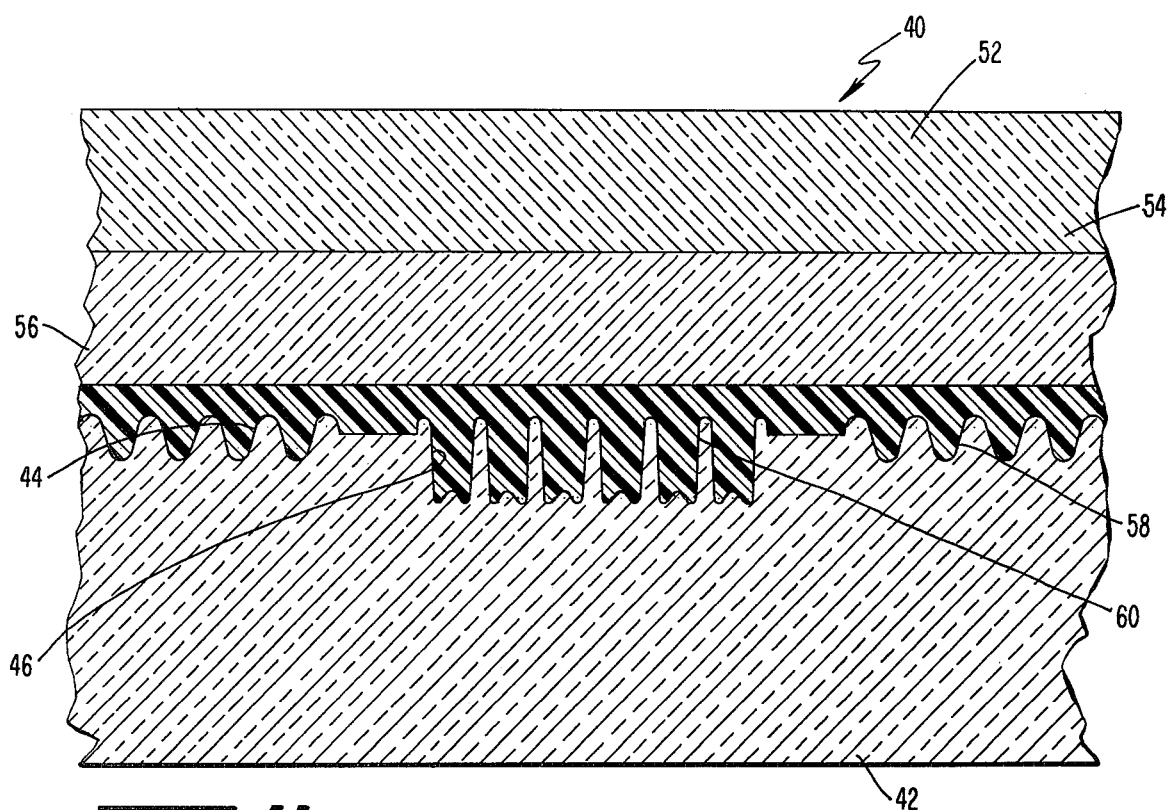
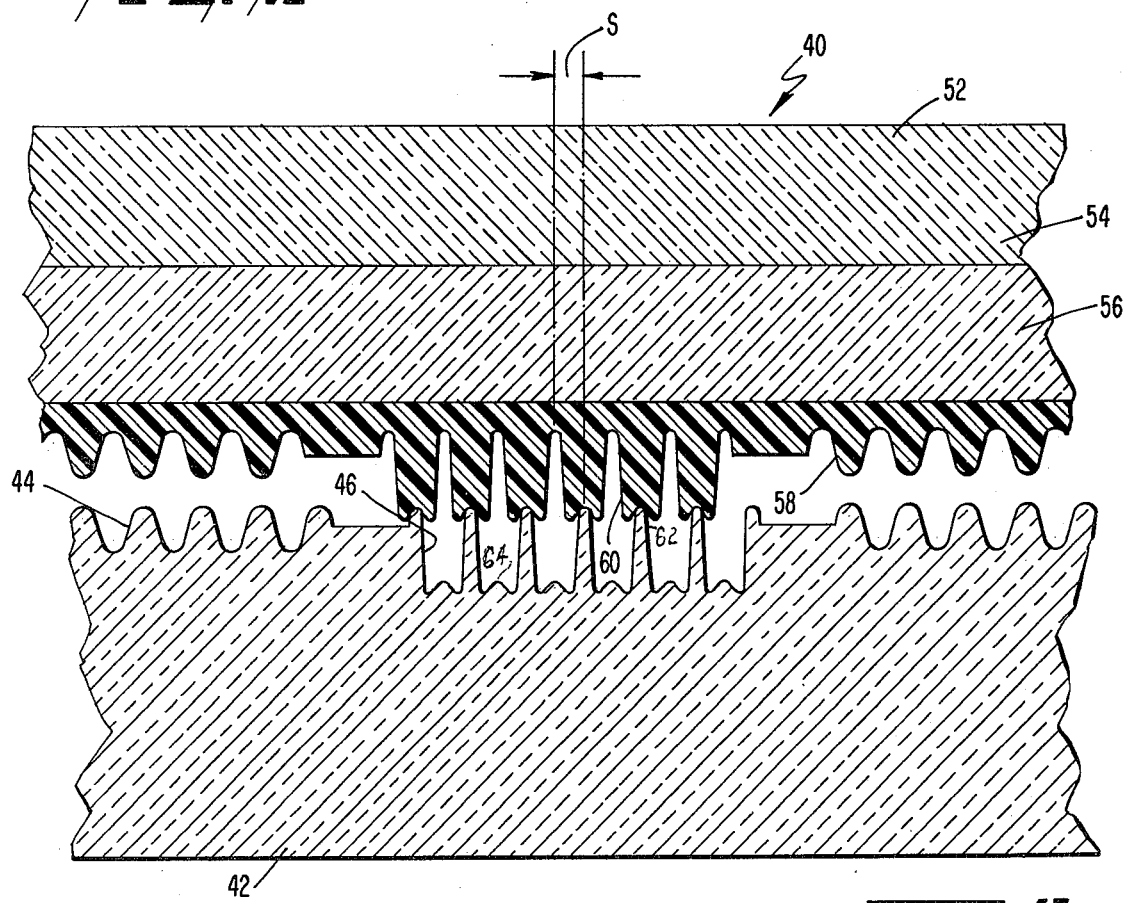

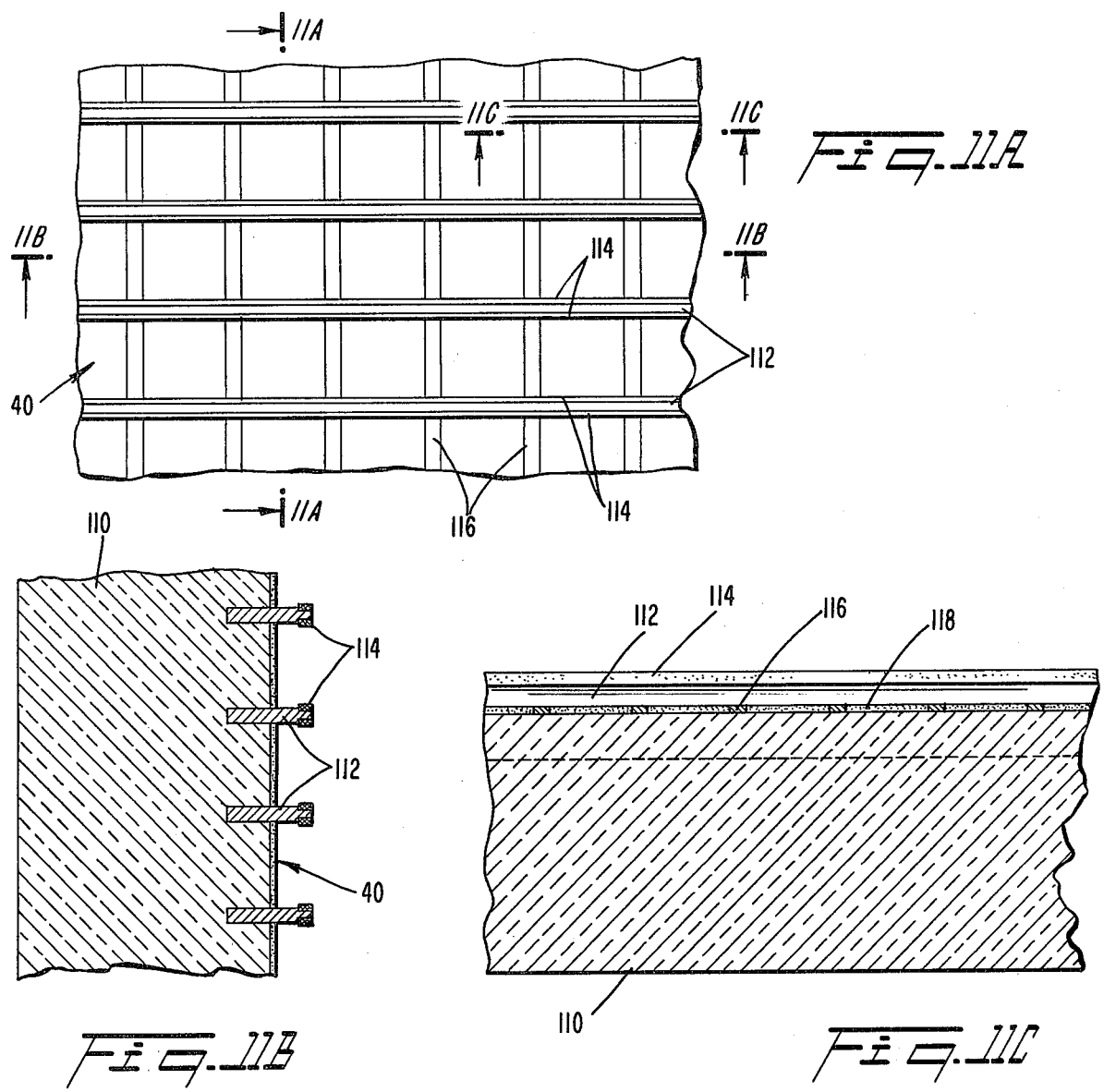
Fig. 11A
Fig. 11B
Fig. 11C
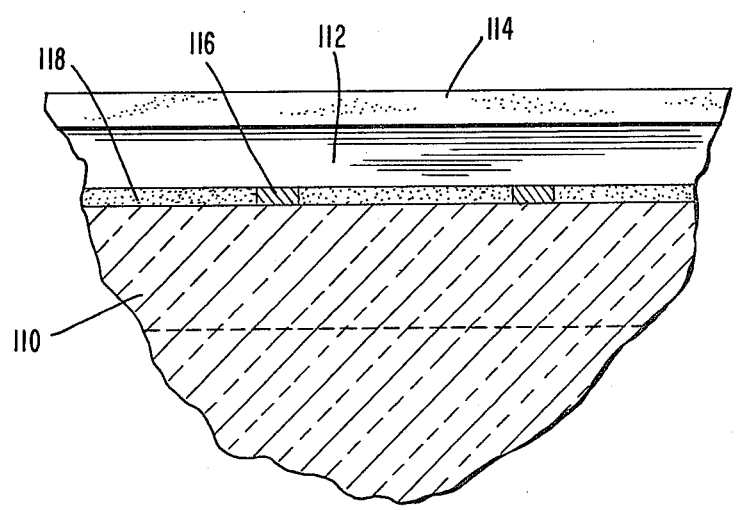
Fig. 11D

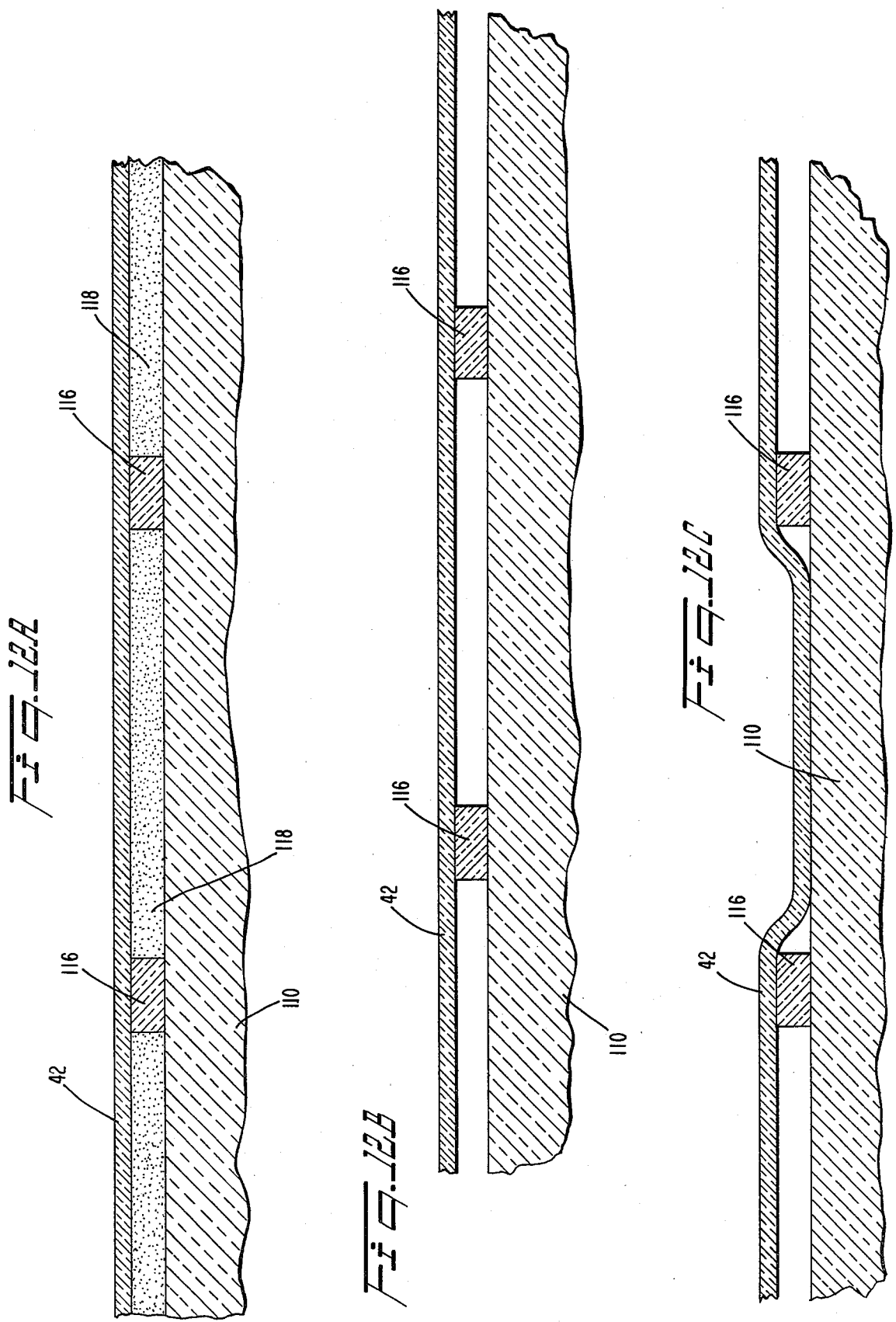

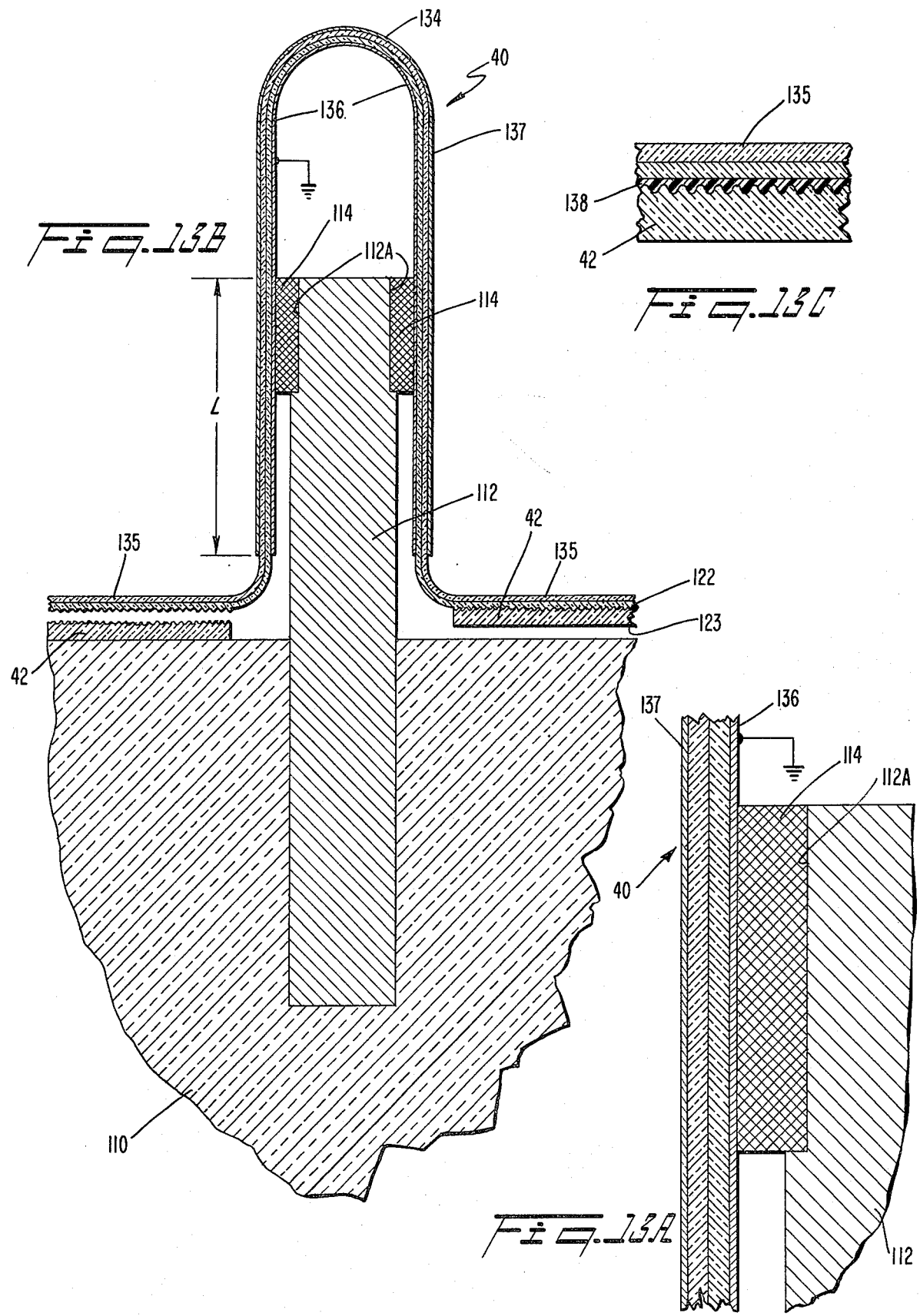

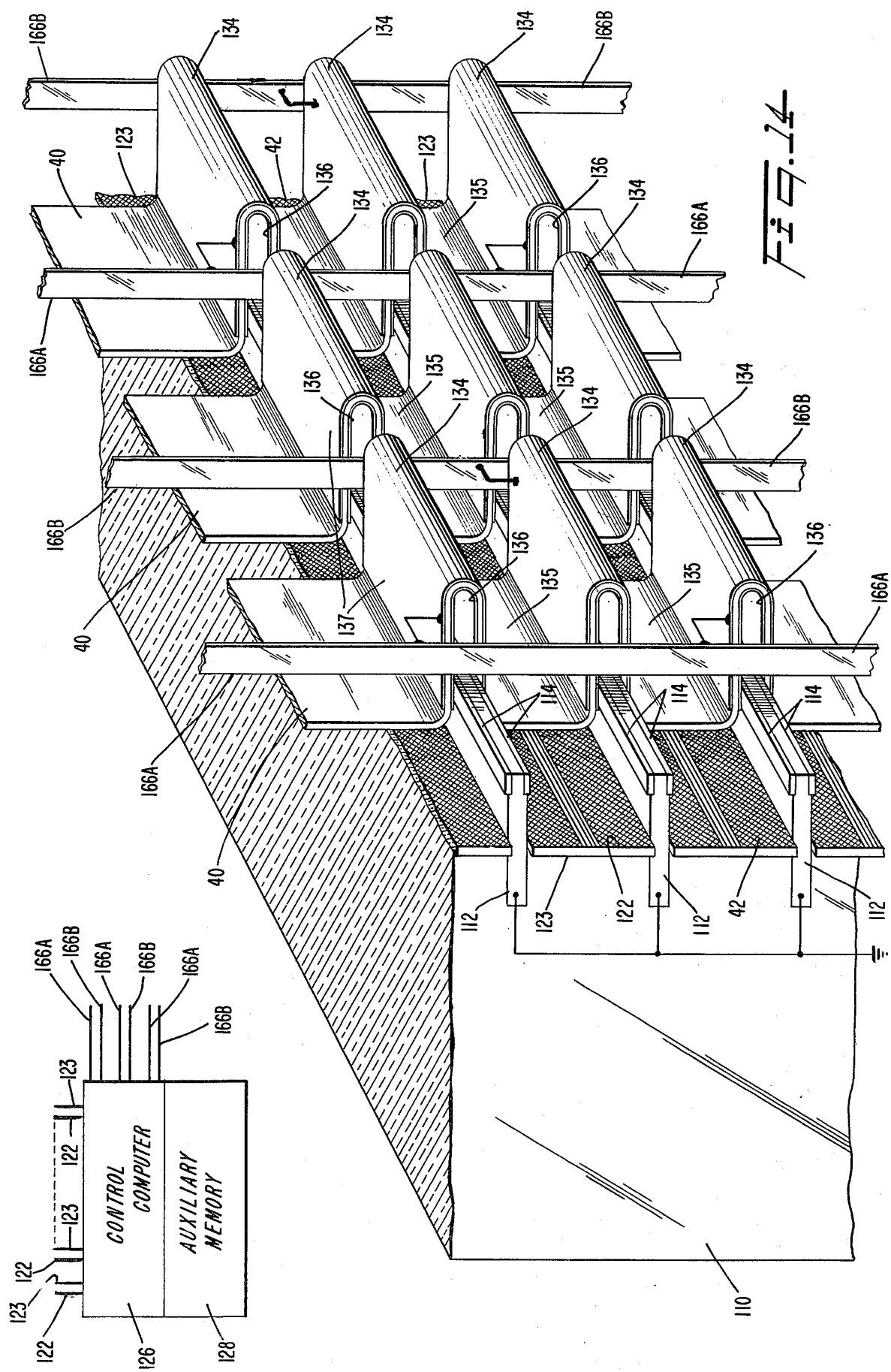

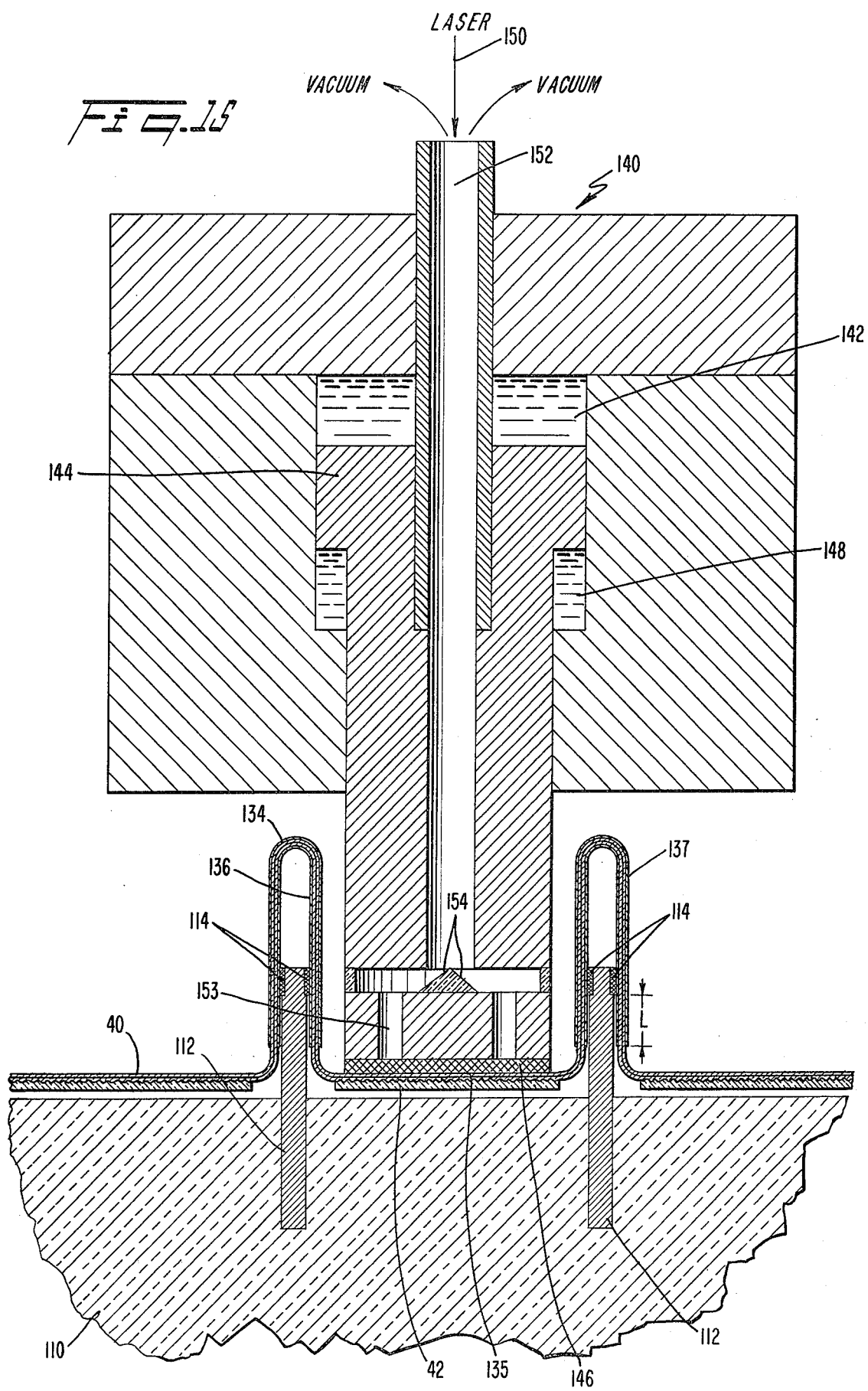

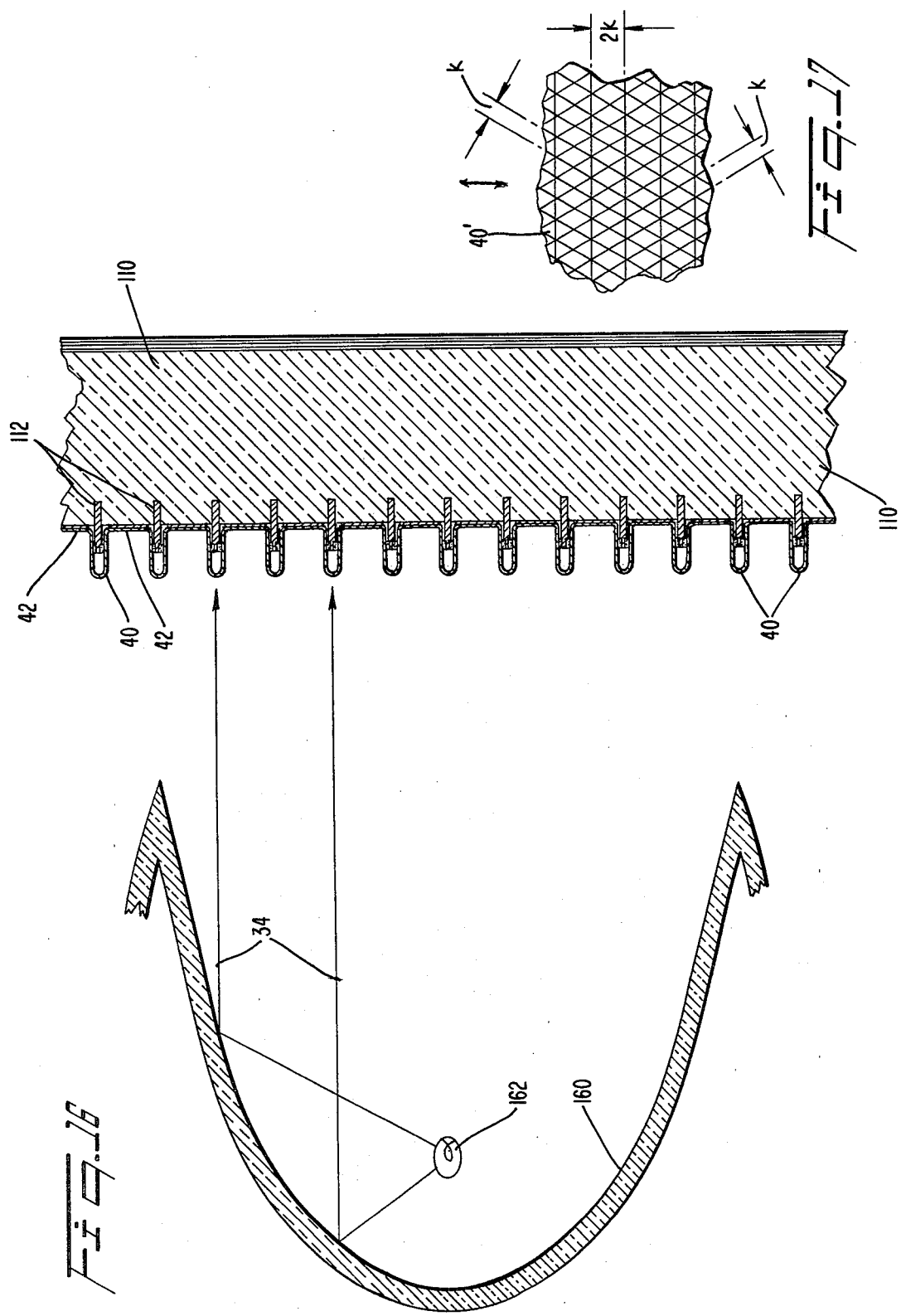

DISPLAY DEVICE AND METHOD UTILIZING PHASE GRATINGS

I. BACKGROUND OF THE INVENTION

1. Field of the Invention

The invention relates generally to light valves and displays formed by light valves.

2. Description of the Prior Art

In my prior patent application for "Light Valve, Light Valve Display, and Method", U.S. Ser. No. 959,055, filed Nov. 9, 1978, it is pointed out that a black and white display comprising a panel with bigrates made of sinusoidal gratings may be used.

It has already been known that phase gratings may be used for purposes of display for microfiche or the like or in slide projectors. See for example R. Bartollini et al., Applied Optics, Vol. 9 (1970), pg. 2283 and M. T. Gale et al., Micrographics, Vol. 8 (1975), pg. 225.

It has also been suggested that relief defraction gratings may be used for display purposes. See M. T. Gale, "Sinusoidal Relief Gratings for Zero-Order Reconstruction of Black-and-White Images," pp. 292–297, Optics Communications, Vol. 18, No. 3, August, 1976, and K. Knop, "Color Pictures Using Zero Diffraction Order of Phase Grating Structures," Optics Communications, pp. 298–303, Vol. 18, No. 3, August, 1976. Numbered references will be found at the end of the specification. The theory of these gratings is understood and need not be discussed at any length.

It is also known that $PVF_2$ may be made to exhibit a piezoelectric effect. See M. Toda and S. Osaka, "Electronical Device Using $PVF_2$ Multilayer Bimorph, Trans.," IEEE Japan Section (in English), July, 1978 and Flexible $PVF_2$ Film; "An Exceptional Polymer for Transducers," Science, Vol. 200, pp. 1371–1374, June, 1978.

The piezoelectric effect and some of its various possible applications are discussed at greater length in an article in Science, "Flexible $PVF_2$ Film: An Exceptional Polymer for Transducers," Vol. 200, 23 June 1978, pp. 1371–1374.

Display effects using a piezoelectric effect are suggested in U.S. Pat. No. 3,172,221 to Ochs, Jr., dated Mar. 9, 1965.

Displays employing diffraction grating effects are suggested in U.S. Pat. No. 3,861,784 to Torok, dated Jan. 21, 1975; U.S. Pat. No. 3,752,563 to Torok et al., dated Aug. 14, 1973; U.S. Pat. No. 4,082,425 to Miller, dated Apr. 4, 1978; and U.S. Pat. No. 4,011,009 to Lama et al., dated Mar. 8, 1977.

U.S. Pat. No. 3,942,048 to Laude et al., dated Mar. 2, 1976 describes a method for modulating the blaze angle of a diffraction grating by an applied voltage.

U.S. Pat. No. 3,347,614 to Fuller dated Oct. 17, 1967 describes a display comprising identical panel elements hermetically sealed and containing magnetic film and colloidal iron suspension and each excited to diffract light to create in total an optical image.

U.S. Pat. No. 3,347,614 to Fuller et al., dated Oct. 17, 1967, describes a display device using diffraction effects associated with a suspension of ferromagnetic particles in a liquid overlying a ferromagnetic film.

U.S. Pat. No. 3,782,806 to Barkley et al., dated Jan. 1, 1974 describes a light switch using polarization filtering and a ferroelastic effect in certain types of crystals to provide an optical switch, and can be used to provide line scanning.

U.S. Pat. No. 3,897,997 to Kalt, dated Aug. 5, 1975, describes a display device using flexible elements electrostatically actuated, and U.S. Pat. No. 1,888,893 to Tschorner, Nov. 22, 1932, suggests a picture reproducing device for television using two superimposed line or cross screens the relative motion of which can expose ony the single element at the intersection to light transmission.

Other U.S. patents which may be of interest are No. 3,957,354, dated May 18, 1976, to Knop; No. 4,057,326, dated Nov. 8, 1977, to Gale; No. 4,082,453, dated Apr. 4, 1978, to Knop; and No. 4,082,438, dated Apr. 4, 1978, to Knop.

II. SUMMARY OF THE INVENTION

The invention takes advantage of the characteristics of bigrates. According to the invention, a light valve comprises a pair of light transmissive elements, each of which has a major face which is close to and faces the major face of the other element. The faces respectively have phase gratings of like periodicity with each face having grating lines parallel to those of the other face of the pair. The elements are movable with respect to each other for selectively positioning the elememnts in one of two positions. In one position, the lines of one face have their maxima and minima respectively coincident with the maxima and minima of the other face, and in the other position, the maxima and minima of one face are coincident respectively with the minima and maxima of the other face. The former position may be considered the dark position because the light transmission of the pair is least. The latter position may be considered the light position because in it the light transmission of the pair is greatest.

Preferably, each of the faces has a sinusoidal grating having lines crossed at 90° with those of another sinusoidal grating. The amplitudes of the gratings on any one face differ from the amplitudes of the other grating. Preferably, the motion of the faces is at 45° with respect to the lines of the gratings.

An array may comprise rows and columns which form picture elements at their intersection points. The rows have a plurality of light transmissive elements which are individually located at the intersection points. The columns have a plurality of light transmissive elements which are individually located at the intersection points. Somewhat as in my prior application, the elements may be locked and unlocked in position by the piezoelectric action of $PVF_2$. In a preferred mode of operation, the piezoelectric action functions to lock all of the rows in place except the selected row which is free to move. Each columnar element may be moved, where movement for change is desired, again by the action of $PVF_2$ to first or second selected positions. After the positions of the movable row has been selected, all of the elements of that row are locked in place. Thus, row by row, a light and dark (black and white) display may be entered into the array of elements.

A particular feature of the invention is involved in the manner in which the column elements are locked into their respective positions. Mechanical stops may be used to lock the columns. Alternatively, grating lines of second or higher order of magnitude may be embossed on the faces of the phase gratings to insure that the selected position provides the maxima and minima of the gratings of the two elements in the desired relationship of two selectable positions.

A feature of the invention resides in providing transverse two or more crossed phase gratings on each face of the pair of elements of the bigrate. The crossed phase gratings of one pair have the same periodicity as the grating lines parallel with the crossed phase grating lines of the other element to the pair. But different gratings on each element may have different amplitudes.

The invention also provides a method of constructing the array of rows and columns and operating them in accordance with the principles described.

III. DESCRIPTION OF THE DRAWINGS

The various objects, advantage, and novel features of the invention will be more fully apparent from the following detailed description when read in connection with the accompanying drawings in which:

FIG. 1 in a single drawing shows a face view of one element of a light valve in accordance with the invention. FIGS. 1A and 1B are a pair of cross-sectional views in different directions of the pair of elements, useful in explaining the principles of the invention;

FIGS. 2A and 2B are enlarged cross-sectional views illustrating two selected positions of a light valve in accordance with the invention in which stops are employed for securing desired selected positions;

FIGS. 3A and 3B are enlarged cross-sectional views illustrating a different type of stop that may be used to secure desired selected positioning;

FIGS. 7A and 7B are enlarged cross-sectional views illustrating how the complex wave pattern may be positioned centrally of the pair of light transmissive elements;

FIGS. 11A, 11B, 11C and 11D illustrate further details of construction of an array, such as that of FIG. 10;

FIGS. 12A, 12B and 12C are enlarged cross-sectional views which illustrate steps of one method useful for construction of the array of picture elements;

FIGS. 13A, 13B and 13C are enlarged cross-sectional views which illustrate details of the construction of the array of picture elements;

FIG. 14 is a perspective view of an array of picture elements embodying the invention;

FIG. 15 is a partial cross-sectional view of the array of picture elements of FIG. 14 illustrating one method by which one of the grating faces may be embossed from the other and how the bimorph arms of the array of FIG. 14 may be appropriately attached;

FIG. 16 is a partial cross-sectional view showing how the array may be suitably illuminated; and FIG. 17 is a partial face view of alternative gratings on an element face.

IV. DETAILED DESCRIPTION

A. Introduction

For many display applications such as alpha-numerics, graphics, and dial indicators, it is useful to form displays in light and dark, some times termed black-and-white, without gray scale.

Arrays of bigrates operated in an on-off mode are particularly suitable for black and white displays. The bigrate element size may be chosen from half to a few millimeters. The number of lines in the array is arbitrary. Displays of small to medium size, measured in inches, can be made for computer terminals, auto dashboards, instruments, or calculators and large displays, measured in feet, can be made for on-the-wall panels. High contrast, high brightness, x-y addressability, frame storage, and relatively low driving power are characteristics of bigrate displays.

The displays produced by an arrangement embodying the invention may be employed for an electronic "page composer", such as are employed in the printing industry. The display may be used on a "page" which is then optically transferred to a printing plate or drum in known manner.

The array of bigrates provides an optical pattern inherently stored in the array, when all row lines are in a "locked" position, so that a display of the array can be used repeatedly. Black and white bigrates preferably using crossed sinusoidal gratings may be used with a white or broad-band light source. If a monochromatic, or nearly so, light source is used, bigrates with rectangular gratings of an amplitude adjusted to the wavelength of the light source, may be used.

In some systems, a line of light valves, rather than an array, is suitable. This can be provided by a single line of the array as here disclosed.

The displays produced by arrangements embodying the invention may also be useful in various types of optical instruments in which it is desired to switch on or off light transmission or a light display with high contrast, high speed, and over a large area.

B. Bigrate Light Valve for Full or no Transmission

Gale, supra, has described black and white microfiche that are based on sinusoidal relief phase gratings. In such gratings the transmission varies as a function of the ratio of amplitude to wavelength so that for a considerable range of that ratio the transmission is very small and zero for a particular value in that range. Accordingly, by choosing the right amplitude, white light illumination produces an almost colorless deep gray. By screening such a grating contrasty dark and white images are obtained. With two sinusoidal relief gratings, oriented at right angle to each other, and having different and well chosen amplitudes $a_1$ and $a_2$, extremely contrasty images are obtained that have blacks without any color shadings. Amplitudes of $a_1 = 790$ nm and $a_2 = 450$ nm turn out to be optimum and are obtained with a 10:6 ratio of exposure when making gratings by interfering laser beams.

Figures 1, 1A, 1B:
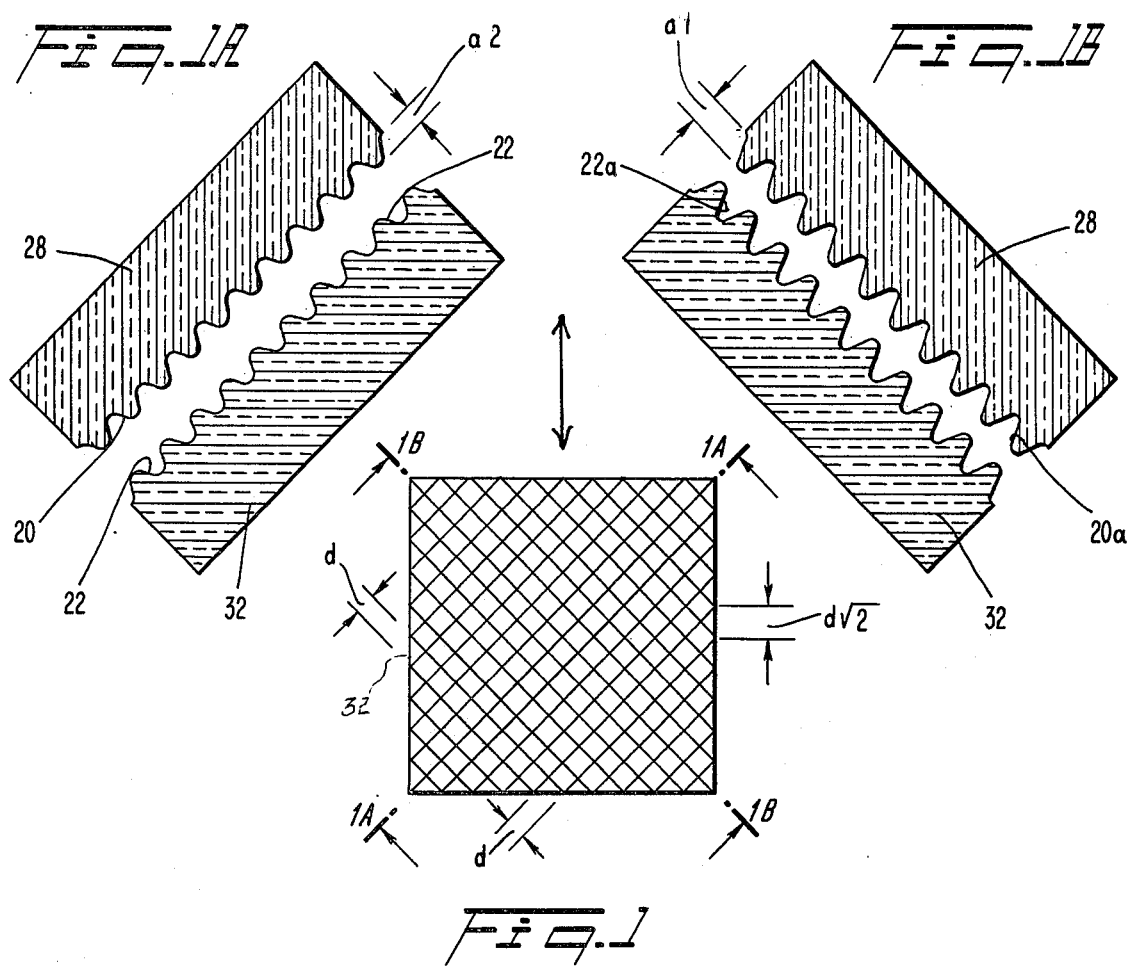

Referring to FIG. 1, a bigrate light valve is illustrated having two sinusoidal surface relief phase gratings 20, 22 having half the amplitude that corresponds to zero transmission in a single grating microfiche. Preferably, the elements of the two strips each have two crossed gratings, each with grating lines at right angles. The upper or column element 28 has gratings 20 and 20a and the lower or row element 32 has gratings 22 and 22a. Each of the gratings on each strip have amplitudes (peak to valley) $a_1'$ for 20a and $a_2'$ for 20 such that $a_1$ equals 790 nm (gratings 20a and 22a), and $a_2$ equals 450 nm (gratings 20 and 22). With these amplitudes, the light transmission of the bigrate in its relatively dark state, (i.e. with maxima facing maxima and minima facing minima), is very small over a wide band of light frequencies. One strip is made to move with respect to the other in a direction at 45° with respect to the grating lines, so indicated by arrow 24. From the "on" position giving full transmission (when the troughs and peaks on one strip correspond to the peaks and troughs of the other) to the "off" position resulting in no transmission (when the troughs in one strip correspond to the troughs in the other) the necessary shift of one strip relative to the other is $d\sqrt{2}$ or whole number multiples thereof, which is equivalent, where d is the period of the gratings. A black and white on-off light valve can be made in this fashion provided that only one or the other of these positions is selected. Intermediate positions produce color as well as intensity changes. The bigrate so made has high contrast and panchromaticity.

The following should be noted here. Referring to Gale, supra, the optical amplitude a is equal to $a=a'(n-1)$, where $a'$ is the physical peak-to-peak amplitude and n is the index of refraction. When $n=1.5$, as is the case for most plastics, then $a=\frac{1}{2} a'$. The peak-to-peak amplitudes on the two sheets of the bigrate are half those of the microfiche, hence are precisely the optical amplitude a when $n=1.5$. Therefore the recommended optical amplitudes $a_1=790$ nm and $a_2=450$ nm that Gale describes are precisely the physical amplitudes needed for the bigrate. The two factors of two are responsible for this coincidental fact. Should the index of refraction be different from 1.5, then the recommended amplitude would have to be multiplied by $\frac{1}{2}(n-1)$ (or divided by $2(n-1)$).

C. On-Off Control

The on-off control of a bigrate requires that the segments of the strips (more fully described hereinafter) assume one or the other of two well defined, selected positions relative to each other separated by a distance equivalent to half the grating periodicity. Since that separation is about a micron, this presents a special problem.

Figure 2A:
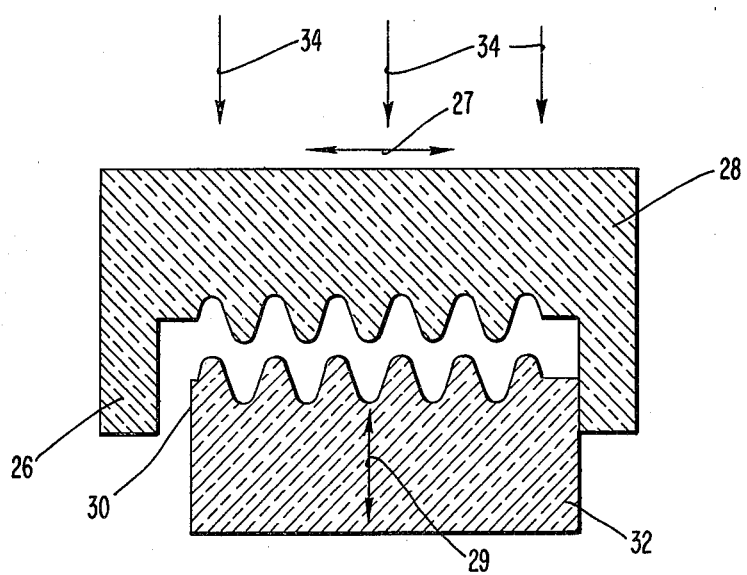

One solution is to use "stops", as illustrated on FIG. 2. Straight stopping arms 26 on a vertical or column light transmissive strip segment 28 positively stop relative motion indicated by arrow 27 of this movable segment against the surfaces 30 of the lower or horizontal or row light transmissive segment 32, to provide substantially full light transmission, as illustrated in FIG. 2A, or minimal transmission, as illustrated in FIG. 2B, of incident light, indicated by arrows 34. The row strip "freezes-in" by motion indicated by arrow 29 the vertical strip in one or the other of the "stopped" positions and releases it when it is desired to control the bigrate, in a mode of operation similar to that of my above-identified prior application, and more fully described hereinafter.

The structure illustrated by FIG. 2A and FIG. 2B requires that the stops be accurately positioned with respect to the phase of the sinewave gratings 20, 22. Furthermore, the distance between the stops on the column segment and the distance between the edges on the horizontal element must have absolutely defined dimensions within a small fraction of a micron. These requirements also apply to the metal masters, if used, from which the vertical and horizontal plastic strips may be embossed, and can be met using sophisticated modern techniques that may include electron beam lithography. Nevertheless the achievement of such absolute accuracy is difficult.

It would be desirable to emboss one of the surface relief gratings 20, 20a from the other grating 22 and 22a so as to insure not only complete identity of the gratings, but also so as to obtain automatically stops that are precisely positioned and thereby eliminate the problem of making two separate masters with very accurate absolute dimensions. The idea of embossing one grating into a material that softens at a relatively low temperature using the other grating made of a material that softens at a relatively high temperature, has been described. See my copending application Ser. No. 959,055.

One way of making such embossing is illustrated in FIG. 3. The stops 34, 36 are provided with a step at some distance h from their ends. The steps have widths s equal to half the grating periodicity. It is apparent that this shape of gratings and stops in one strip or element, when embossed in the other, will provide an arrangement that has definite stopped positions separated by the desired distance. There is no requirement for having a specified distance between the stops 34 on one side to those 36 on the other. Hence the arrangement of FIG. 3 is less demanding than that on FIG. 2. However, sophisticated techniques that include electron beam lithography are still required to form the sharp cornered stops with absolutly dimensioned steps. Moreover, the steps on which the horizontal strip presses against the vertical strip in the non-transmission case, FIG. 3B, are very small in area, so that the arrangement is rather fragile and prone to wear and deformations.

D. Complex Wave Stops

A way of making on-off bigrates that do not suffer from the above mentioned difficulties, consists of using, as a means for selective positioning, complex wave reliefs. The area of the complex wave is small compared to the area of the gratings so as not to be significantly visible. These are embossed on the strips simultaneously with the embossing of the gratings. The gratings and the "complex waves" are first embossed on one of the strips, preferably the row one, from which they are then embossed on the other, preferably the column one. The complex waves can be on the sides of the strips.

Figure 4A:
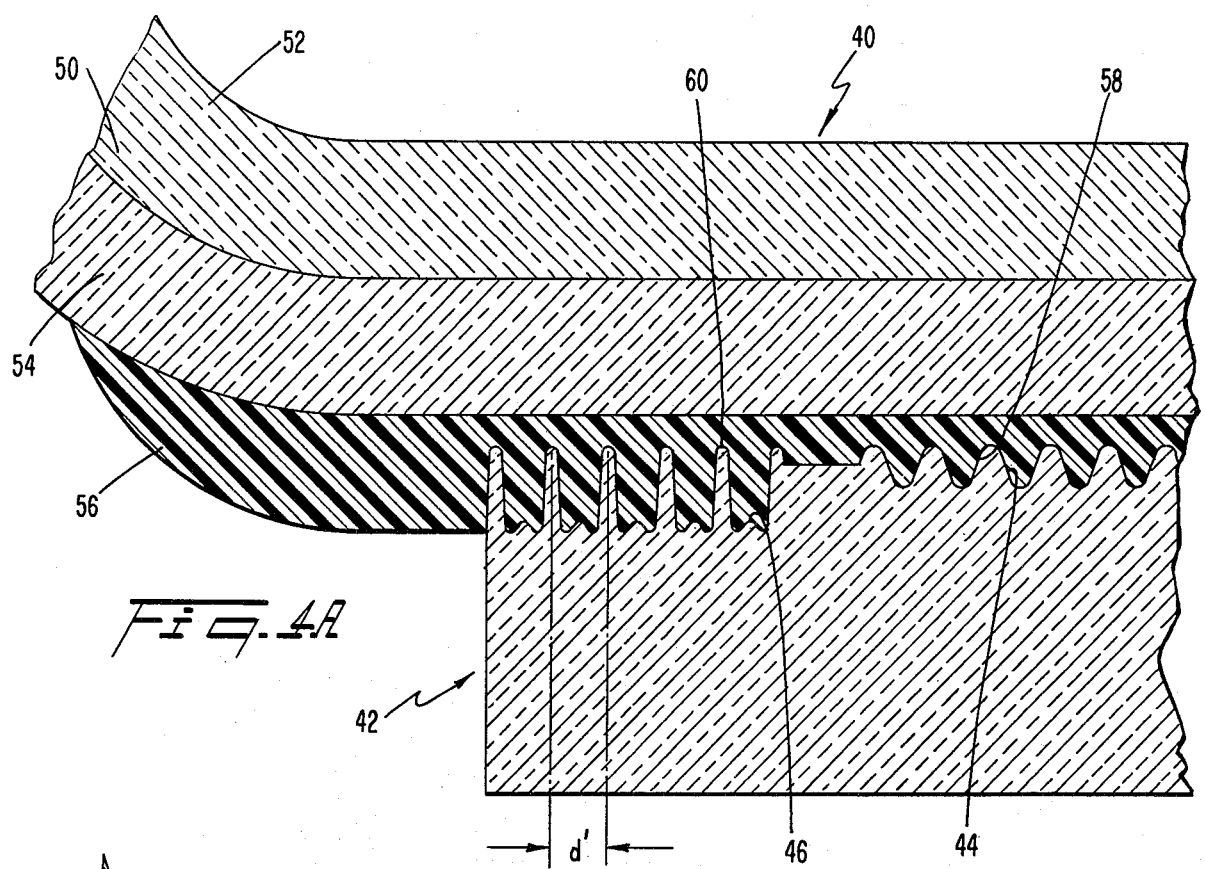
FIGS. 4A and 4B illustrate different apparatus for securing selected positioning employing a complex wave pattern.
Figure 4B:
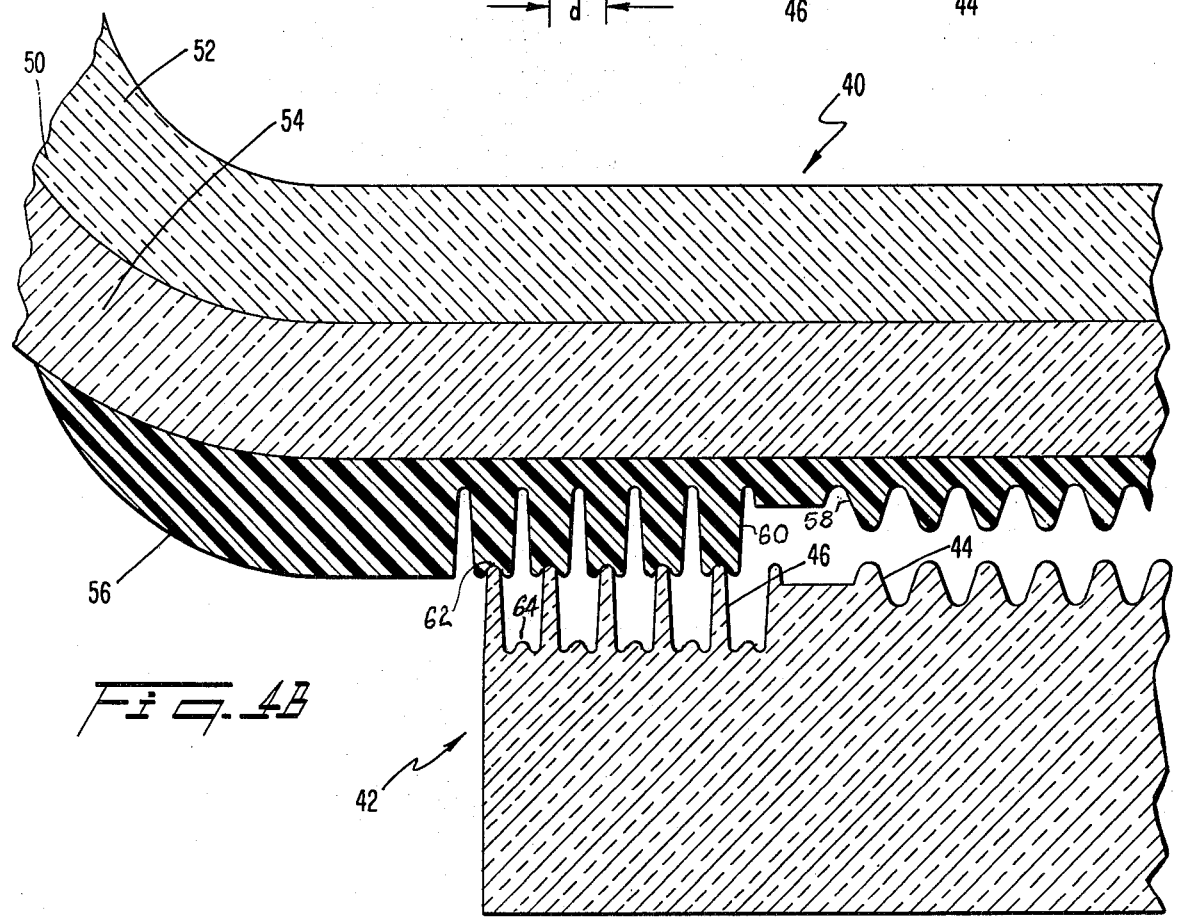

In FIGS. 4A and 4B are shown in cross-section a vertical or column strip 40, and a horizontal or row strip 42. The row strip 42 is a strip of $PVF_2$ which has on its major surface facing a major surface of the column strip 40, a sinusoidal waveform 44 and a complex waveform 46, both embossed from a metal master.

The terms rows and columns, or horizontal and vertical, are used only for convenience in description, and imply no particular orientation relative to a geographical perpendicular.

The column strip 40 comprises a bimorph 50 (only partially shown in FIGS. 4A and 4B) formed respectively of outer and inner joined strips 52 and 54 of $PVF_2$. The inner strip 54 has on the surface not joined to outer strip 52, and particularly on the flat segment a thin, embossable plastic layer 56. The exposed surface of plastic layer 56 is in this case the major surface of the column strip 40 facing the embossed major surface of the row strip 42. The plastic layer 56 is embossed from the embossings 44, 46 to provide sinusoidal and complex waveforms 58 and 60 precisely matching and converse to sinusoidal and complex waveforms 44 and 46 respectively.

The complex wave pattern 46 is formed on the original metal master by interfering laser beams, just as are the gratings, as described hereinafter. Instead of one pair of beams producing sinusoidal undulations, two pairs of beams are used, one adjusted to interfere with the same periodicity, d', as the gratings and the other adjusted to half that periodicity, ½d'. With proper phasing (cosine waves) and proper relative amplitudes in the intensity of the two pairs of laser beams, a wave shape is obtained, such as complex waveform 46, that has relatively sharp and high maxima 62 spaced d' apart and relatively low maxima 64 spaced half way between them.

It is apparent from FIGS. 4A and 4B that, when the strips press against each other, the element from the vertical or column strip 40 (the upper element as viewed in FIGS. 4A and 4B) has two stable positions with respect to the horizontal or row strip 42 or element. In one position, that which was embossed from the horizontal strip, shown in FIG. 4A, there is full or nearly full light transmission of the incident light. The other position is that for which the relatively high maxima 62 on the horizontal strip 42 fit into the relatively shallow minima in the vertical strip, as illustrated on FIG. 4B. There is a relative shift between the strips of precisely ½d', and there is no or little light transmission of the incident light 34.

The operation of an array of bigrates made as described above is row by row and in that respect is similar to the row by row operation described in my said copending application. All the row strips 42 with no voltage applied to its transparent electrodes press against the column strips except the selected row line. This selected row line is energized so as to expand and allow the column segments or strips 40 to move freely. After each column segment or strip 40 has moved according to the video signal applied to its strip, the selected horizontal line is deenergized and "freezes-in" all vertical segments at their new positions.

If there are crossed gratings, the complex wave must be such that the difference between the heights of the relatively higher and relatively lower maxima are equal to twice the depth $a_1$ of the higher of the two crossed gratings plus the desired clearance, c, (See FIG. 4B) between the two gratings in their "off" position. When the patterns are made by interfering beams, the intensity of the light varies as the square of the amplitude of the standing waves produced by the interfering beams. Thus two pairs of interfering beams, one pair interfering with the periodicity d' and having a relative amplitude m, and the other pair interfering with a periodicity of ½d' and having a relative amplitude of 1, will produce any intensity variation y given by the relation:

$$y = (m \cos \beta + \cos 2\beta)^2 \qquad (1)$$

Figure 5:
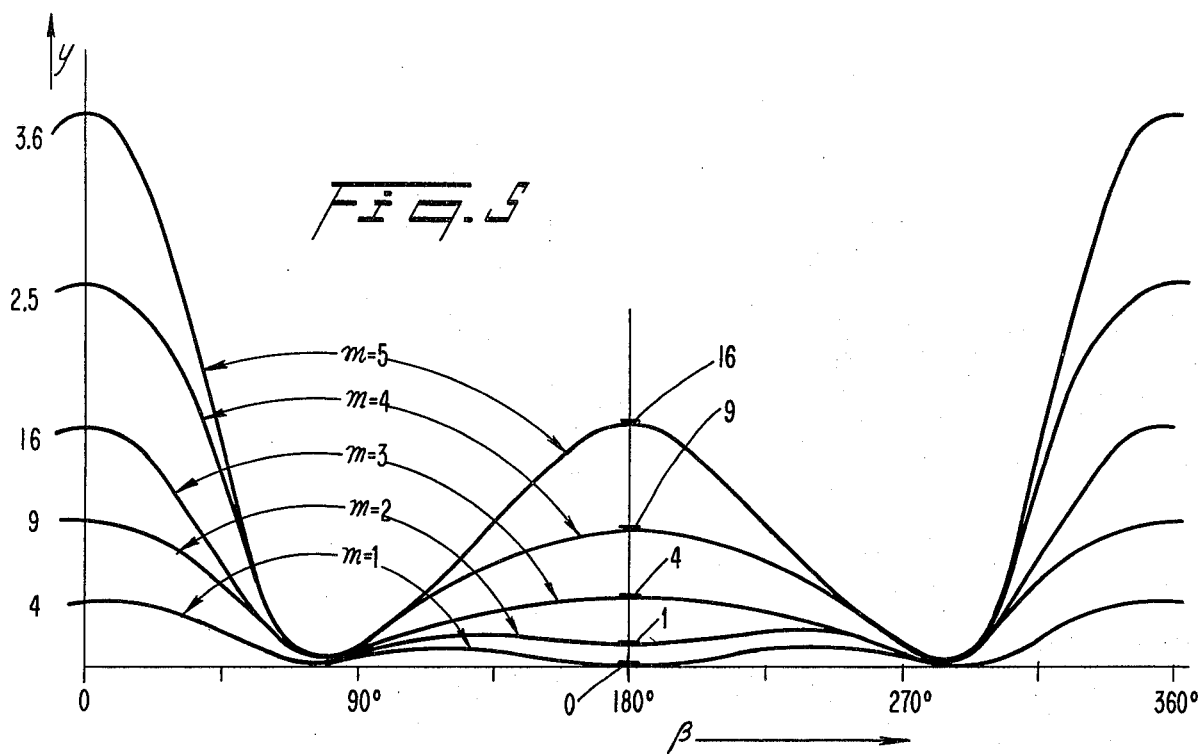
FIG. 5 is a graph of curves useful in explaining how the complex wave pattern of FIG. 4 may be derived.
Figure 6:
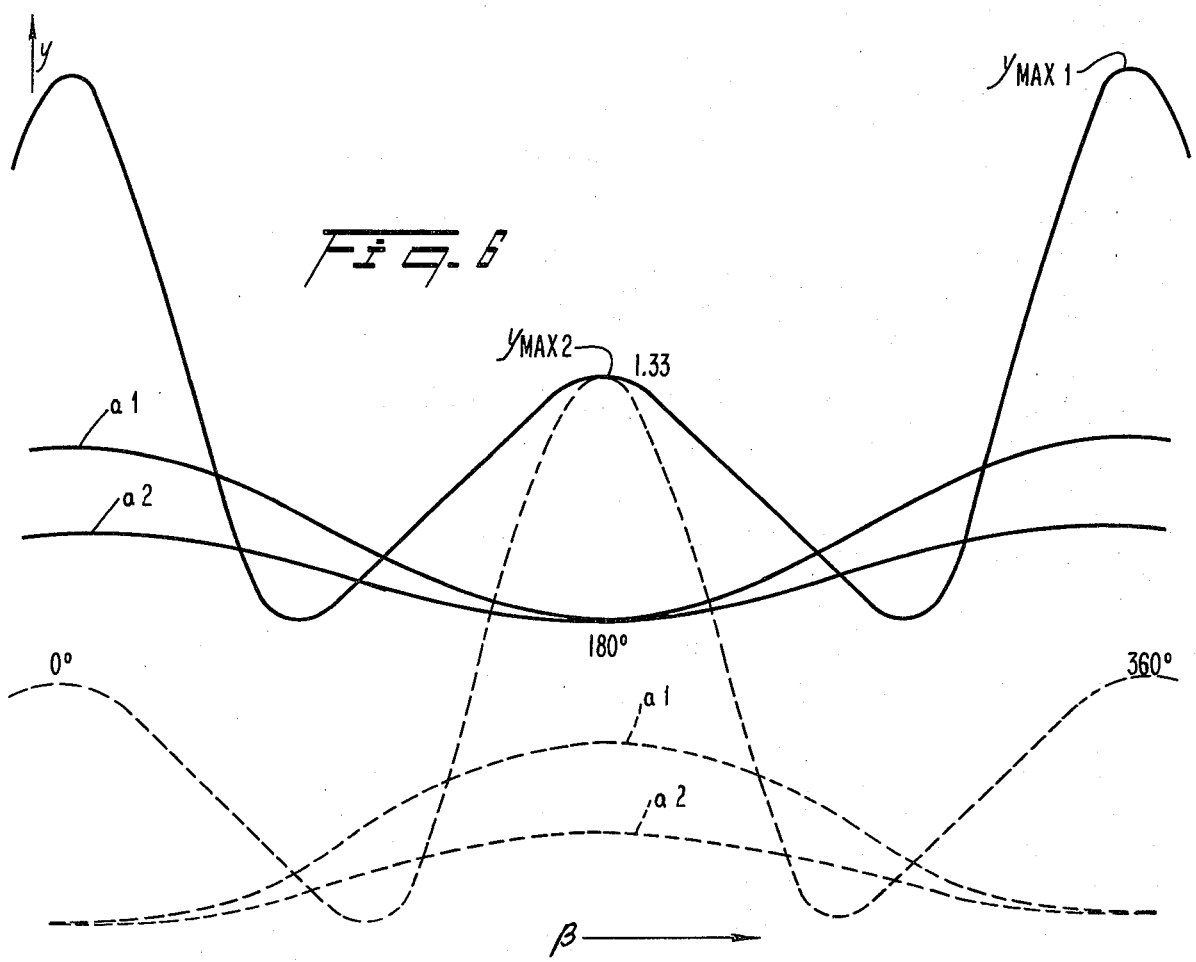
FIG. 6 illustrates complex wave patterns derived from the different parameters illustrated in FIG. 5.

(See M. T. Gale, supra) where $\beta = 2\pi x/r$ and x is the distance along a strip being exposed, r is the distance between peaks (or crests) or between valleys. Y is then also proportional to the depth of the resultant etched wave. This function is plotted in FIG. 5 for various values of m. It turns out that the extremum at $\beta = 180°$ is a minimum for values of m less than 3 and a maximum for values of m greater than 3. While any value of m greater than 3 produces a desired maximum, the choice of m=5 is particularly advantageous. For that choice, FIG. 6 illustrates in detail the relative positions of the complex wave and the two crossed gratings for the two stable positions.

The use of complex waves, instead of stopping arms, as a means to insure precise on and off positioning has many advantages. It relies only on optical interference techniques. that provide the required submicron shaping. No "machining" by electron beam lithography of complex contours is necessary. Furthermore many sharp edges fitting into many matching grooves provide a redundant and rugged positive positioning.

Figure 8:
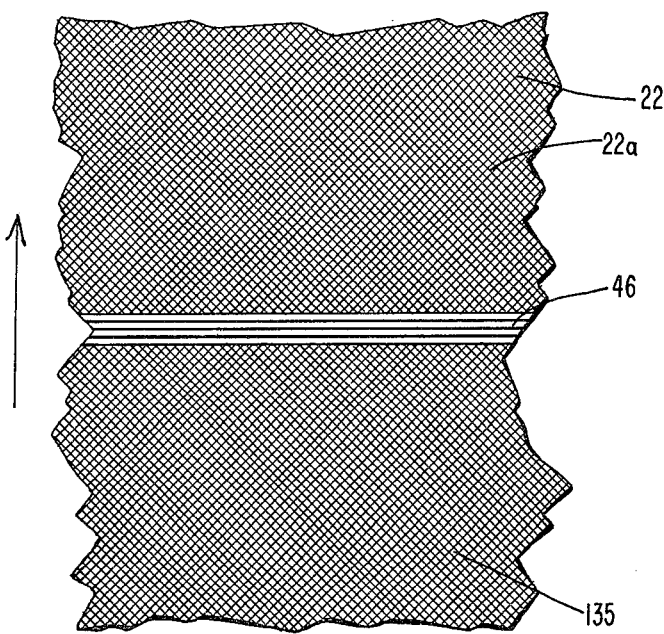
FIG. 8 is a face view of one bigrate element showing how the complex wave form appears on an element face.

A single complex wave in the center of the horizontal strip and bisecting each vertical segment can be used, as illustrated in FIGS. 7A and 7B, instead of two complex waves on the sides of the strip. The action is as effective and less strip area needs to be used for the purpose. FIG. 8 is a face view of a portion of a row strip 42 (a column strip 40 would appear the same). It shows the crossed gratings 22 and 22a at 90° to each other and at 45° to the length of the strip. It also shows the complex wave 46 at the center of the strip. Relative motion is at 45° to the grating lines, as indicated by the arrow.

E. Generating Relief Structures by Interference Techniques

Figure 9A:
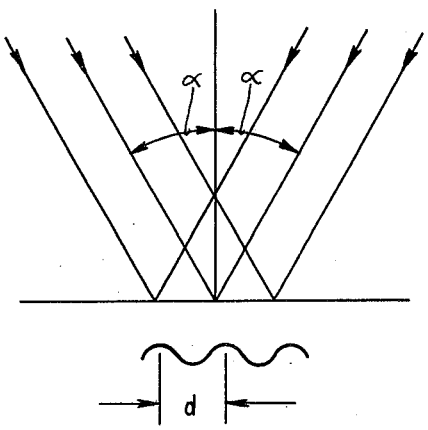
FIGS. 9A, 9B and 9C are schematic views of the manner of deriving the desired wave patterns by using laser beams.
Figure 9B:
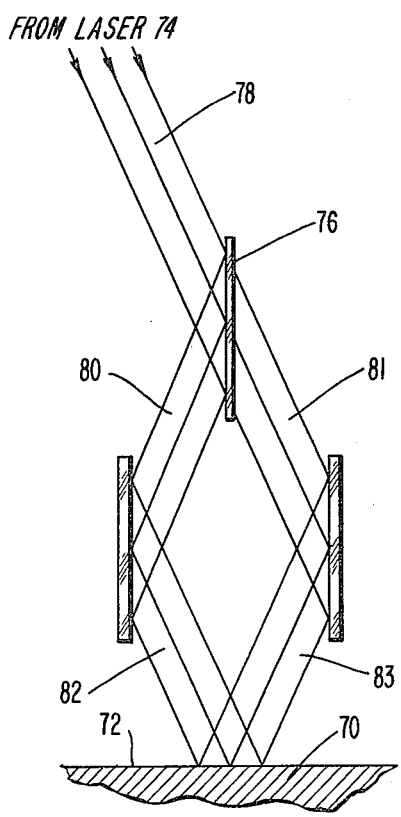

The interference of two coherent beams derived from a single laser is widely used to produce gratings. Gale, supra, describes some of the details of the procedure. Two interfering beams originated from a laser of wavelength λ, separated by an angle 2α, and making an angle of α with respect to the normal of the plane, produce a sinusoidal variation of intensity of period d, where $$\sin \alpha = \lambda/2d \qquad (2)$$

as illustrated on FIG. 9A. An optical arrangement such as the one schematically shown in FIG. 9B will produce the necessary light variation to produce a grating. A metal or metallic material 70 covered with the proper photoresist 72 is exposed to light derived from a laser 74. A beam splitter 76, which may comprise a half-silvered mirror, divides the laser beam 78 into two beams 80, 81 which are redirected respectively by mirrors 82, 83 to expose the photoresist 72 in the desired pattern and strength. After development a sinusoidal relief pattern is obtained.

Figure 9C:
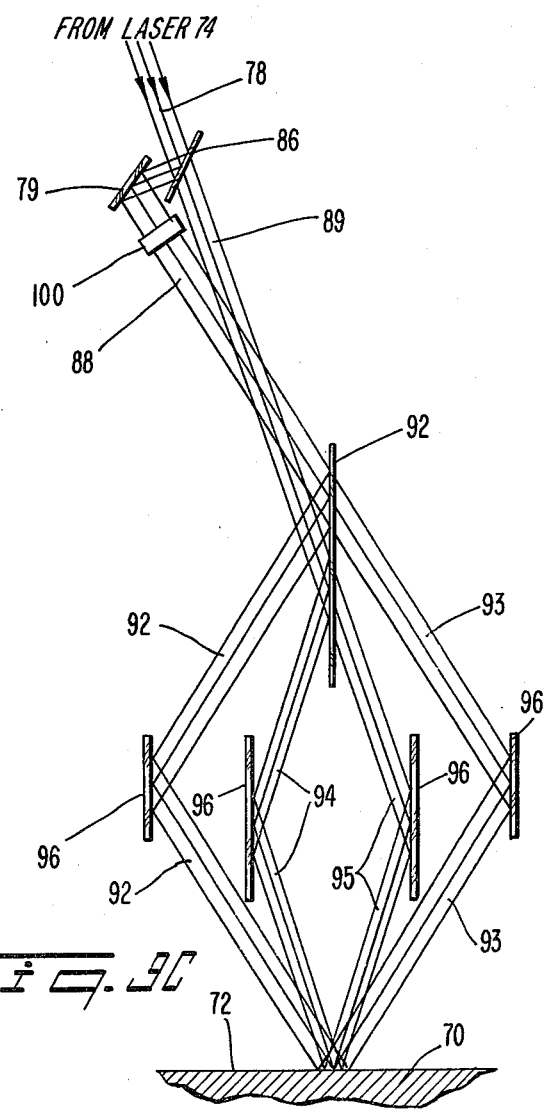

Similarly an optical arrangement as schematized in FIG. 9C can produce an intensity variation according to equation (1). The laser beam 78 is split by an adjustable beam splitter 86 into beams 88 (redirected by mirror 79), and 89 which are directed to respective areas 90, 91 of a beam splitter 92. The beam splitter 92 splits beam 88 into beams 92, 93 and beam 89 into beams 94, 95. The beams 92, 93, 94, and 95 are now redirected by the various mirrors 96 to a like area of the photoresist 72, to form the complex waveform or pattern when the photoresist is washed and the metal etched. For this to be true, the beams 92, 93, 94, 95 must strike at the proper angles. The inner beams 94, 95 must have an angular separation resulting in interferences with a periodicity $d = d'\sqrt{2}$, while the outer beams 92, 93 must have one that results in a periodicity ½d'. The periodicity of d=1.4 μm provides a large rejecting angle between the zero and first orders and was chosen by Gale, supra, and Knop, supra, for the microfiche. Here d=1.414 μm ($d = \sqrt{2}$ microns) so that the shift $s = \frac{1}{2}d'$, will be exactly one micron. Using a He-Cd laser ($\lambda = 441.6$ nm) the angles $2\alpha$ between interfering beams corresponding to the periodicities of 1 $\mu$m, $\sqrt{2}$ $\mu$m and 2 $\mu$m are respectively:

| d (nm) | 1000 | 1414 | 2000 |
|---|---|---|---|
| 2α (degrees) | 25.52° | 17.96° | 12.78° |

The relative intensity of the two pairs of beams can be adjusted by the ratio of reflected to transmitted light by the first beam splitting mirror 86, so as to obtain the desired value of the coefficient m (m=5) in equation (1). Since the intensity of light is proportional to the square of the amplitude of the electromagnetic wave producing it, the ratio of intensities of the inner to the outer beams should be $5 = 2.237$ to obtain a ratio of amplitude m=5.

There must be no phase shift between the interferences at periods $d'$ and at periods $d'/2$. The phase of the interferences at $d'$ with respect to those at $d'/2$ is determined by the differences in the lengths of the light paths of the interfering beams. In practice, it is not possible to make absolutely equal the paths of the beams in one pair, or to insure an exactly specified difference of path lengths between the inner and outer pair. Hence, in general, there will be a phase difference between interferences of periodicity $d'$ and $d'/2$. In other words the intensity will vary as:

$$y = [m \cos \beta + \cos (2\beta + p)]^2 \quad (3)$$

This variation of intensity does not provide the desired relief shape, unless p=0. One way of achieving zero phase p=0, is to control the optical pathlength in one of the pairs of beams. (See FIG. 9C), by a phase control element 100 in the path of one of the beams 88, 89. For example, an electrooptic cell can be used for that purpose. In such a cell the phase of the light is changed by applying an electric (Kerr effect) or magnetic (Faraday effect) field to a suitable material. Such phase delay devices are well known and are commercially available. The phase adjustment may proceed in empirical steps. For each adjustment the photoresist is developed and the resulting waveshape is viewed in an electron scanning microscope. By extrapolating the results of the adjustments, the desired phasing p=0 can be reached by very few steps.

Once adjusted for the values m=5 and p=0, the optical system can be used repetitively to make as many exposures as desired. Furthermore, the once set adjustments can quickly be duplicated if necessary, by using the right pattern as a sort of calibrating template and taking advantage of the fact that when that pattern or waveform on a transparent strip is reexposed in its original location, the total light transmitted is a minimum for the phase p=0.

The metal mask from which the horizontal strips are embossed is made according to the procedure described by Gale, supra, only with additional exposure for the complex waves. The strip, or a portion of the strip, is exposed first to produce one of the gratings and the exposure is adjusted accordingly. Then the strip is turned at 90° and it is again exposed with an exposure adjusted this time for the other amplitude. Alternatively both exposures can be made simultaneously by using two systems of interfering beams of the type of FIG. 9B located in two planes orthogonal to each other. In that case the light from a single laser is appropriately split into the two systems to provide the exposures required for the two different amplitudes ($a_1 = 790$ nm and $a_2 = 450$ nm). When the two gratings are exposed, successively or simultaneously, the center of the strip is masked. Next, the center is unmasked, the previously exposed areas are masked, the strip is turned at 45°, and the center is exposed by an optical arrangement such as that of FIG. 9C. The exposure is adjusted so as to obtain the right relative depths between the gratings and the complex wave. The desired relative amplitudes are shown in FIG. 6. Because the actual depth achieved after development of the photoresist is not linearly related to the exposure, the exposures necessary to obtain given depths are determined empirically in practice. There are four amplitudes of interest: $a_1$, $a_2$, $y_{max1}$ and $y_{max2}$. (See FIG. 6). The amplitudes $a_1 = 790$ nm and $a_2 = 450$ nm are obtained with a ratio of exposures of 10:6, according to Gale. Next the exposure for $y_{max1}$ such that $y_{max1} = 3a_1$ is determined. Finally the exposure for $y_{max2}$ (which with linear photoresist would be in the ratio of $1:\sqrt{5}$ or 1:2.237 to $y_{max1}$) is determined.

Once the right pattern is made on the horizontal strip master no further submicron shaping and no submicron adjustments when assembling the array are necessary. In situ embossings of the column strips from the row strips automatically provide identical and properly located gratings as well as positive means to insure the exact position for full transmission and the exact position for no transmission. It is noteworthy that this result is obtained by the extension of optical interference techniques that are used anyway to make the gratings.

From the horizontal line metal master many embossings of plastic strip can be made. The master tape, connected end-to-end in a loop, can be used to press the plastic strip in indefinitely long strips. For this purpose the system developed for the holotape can be used. See R. Barotini, W. Hannan, D. Karlsons and M. Lurie, Appl.Opt 9 (1970) 2283.

The horizontal strip consists in a single strip of PVF$_2$. Embossings can be made directly into the PVF$_2$. Alternatively the PVF$_2$ strip can be coated with an easily embossed material, though one which softens at a higher temperature than that used on the column strips.

F. Construction of the Array

The array is constructed by mounting the row and column strips 40, 42 on a supporting plate in a manner generally analogous to that described in my prior application above-identified. However, notable changes are desirable to ease the embossing of one strip from the other and to simplify the method of assembly. The following is a description of the construction procedure.

Figure 10B:
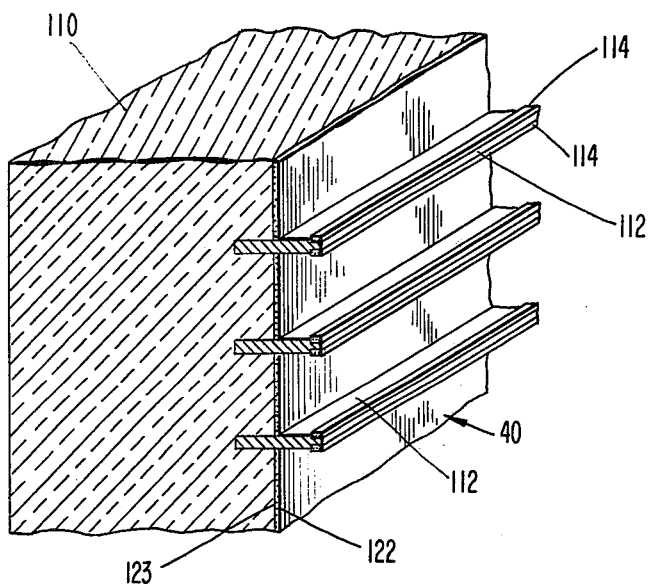
FIGS. 10A, 10B and 10C show a partially constructed array.
Figure 10A:
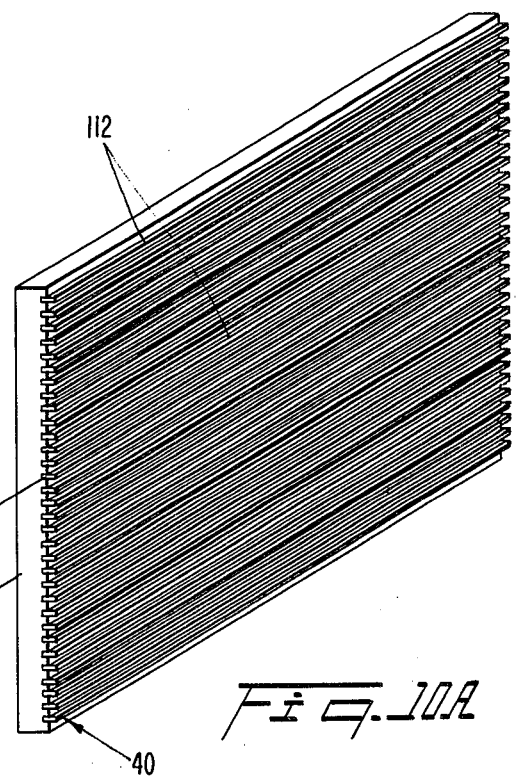
Figure 10C:
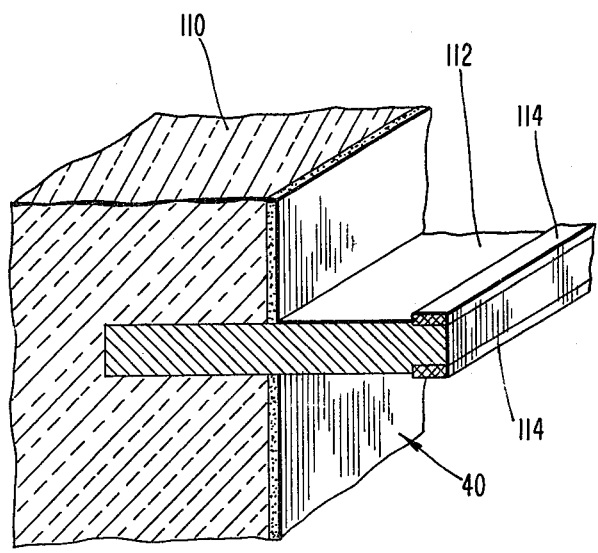

(1) The supporting plate 110 is a flat transparent sheet, such as lucite, into which metal strips 112 are embedded along lines parallel to the row lines. The supporting plate 110 is shown schematically in FIG. 10A. The metal strips 112 inserted into it are shown in more detail in FIG. 10B and 10C. These strips 112 are metal ribbons that are typically about 0.004" (100 micron) thick and about 0.020" to 0.030" (600 micron) wide. Each plate has one end tightly embedded into the support plate 110. The other end, slightly indented at indentation 112A at the exposed edges, is coated with a low melting point bonding metal 114 which is received in the indentations 112A. FIGS. 10B and 10C show enlarged details of the plate and embedded ribbons 112.

See also FIG. 11A for an enlarged partial sectional view.

(2) Referring to FIGS. 11A, B, C and D, columnarily oriented supports 116 for the row lines are formed. These supports are about 0.001" (25 microns) high and are spaced one line apart (e.g. about a millimeter apart). They can be made by photolithography, as is described for other applications. See L. S. Cosentino and W. C. Stewart, "Membrane Page Composer—Further Developments," RCA Review, December, 1974, Vol. 35, No. 4, and J. A. van Raalte, "A New Schlieren Light Valve for Television Projection," Appl.Opt., Vol. 9, p. 2225, October, 1970.

(3) A soluble material 118 is applied between these supports so as to create a smooth plane. The material can be soluble in water or any other liquid in which the plastic used is not soluble. (See FIGS. 11C, 11D, and 12A).

(4) The horizontal strips 12 of $PVF_2$, after being embossed from the metal master, are coated with transparent conductive electrodes 122, 123 (See FIG. 14) as indicated and are polarized. Also the grating side is coated additionally with a very thin layer (not shown) of teflon.

(5) The row strips 42 are mounted on the support plate 110. The row strips 42 lie flat on the soluble material 118 (FIG. 12A) between the vertical supports 116 for the horizontal strips 12 and are thus supported along their whole length. The strips 42 are bonded to the (0.001" high) supports.

(6) The column strips 40 (FIGS. 12A, 12B, 12C, 13A, 13B, and 14) are made by bonding two strips of $PVF_2$ that are oppositely polarized. The strips are then formed into a serpentine of alternating U bends 134 and straight segments 135 (FIGS. 13B and 14) so shaped as to exactly fit over the supporting strips 112 on the support plate 110. The U bends, each side which form bimorphs, are metalized inside and outside by coatings 136, 137 respectively, which may extend over the inside and outside of the bend respectively. The straight segments 135 are coated on its one major face facing against row strip 42 with an embossable transparent plastic material 138, such as polyvinyl-chloride (PVC). See enlarged partial sectional view of FIG. 13C.

(7) The column strips 40 are mounted on the support plate by fitting them over the column strip supports 112, as shown also in the perspective view of FIG. 14 and the sectional view of FIG. 13B.

(8) A fixture comprising a hydraulic press 140 may be used (see FIG. 15) to emboss the column strip straight segments 135 from the row strip 42 segments, one element at a time. The oil from the reservoir 142 on top of the piston 144 of the press 140 is pressurized and this pushes the piston down on the straight segment 135 of the column strip. At the same time a large current millisecond pulse through a heating pad 146 (a thin metal strip) softens the embossable material 138. After embossing, the strips are separated by lifting the vertical strips segment 135 which is held tight against the piston by a vacuum chuck exercised through a central hole 152 through the piston communicating with small access holes 153 (shown much enlarged). The piston 144 is lifted by oil pressure applied to a second reservoir 148 beneath the piston cap. The piston 144 is lowered again by means of very small pressure on its top by reservoir 142, so that the column and row strips have their gratings and complex wave snugly against each other. The teflon coating on the H-strip prevents any sticking.

(9) The column strips 40 are now fastened to the supports 112. This is accomplished by illuminating the bonding metal 114 on the row-oriented adjacent metal supporting strips 112 by an intense and very short pulse of laser light from a laser 150. The light from the laser 150 is transmitted through the central hole 152 in the piston 144 which also serves as the vacuum line. It is reflected onto the bonding metal pads by 45° tiny mirrors 154 placed on the bottom of the hole.

(10) This "touchless" bonding of the vertical strips insures that: (a) the vertical strips are mounted at exactly the right height which is desirable for reasons explained hereinafter; (b) there are no strains or stresses on the arms of the U bends 134 so that the neutral non-energized position of the vertical strip corresponds to a fully transmissive bigrate; (c) the length L of each bimorph arm is well defined by the lower side of the indentation 112A of the metal supporting ribbon. (See FIG. 13). In FIG. 13B, the left hand portion shows a row strip 42 energized by voltage applied to electrodes 122, 123 in order to free column strip 40. The right hand portion shows a row strip 42 not energized and locking the column segment 135 in place.

(11) The loops in the column strip 40 permit bonding each element independently of the bonding of its neighbors. Indeed, after an element is bonded, the fixture is transferred to the next element where it can adjust its height to any desired height (within limits). Slight differences of height between adjacent elements simply cause the loop between them to be slightly bent.

(12) A fraction of a second suffices to emboss the column strip 40, to free it from the row strip 42 and to fasten it to its supports. The placing of the fixture over the element takes longer and may be as long as a second. Many elements can be handled at a time with a multi-head fixture so that an entire array can be completed in a reasonable time even if there are very many elements.

(13) The fixture has a relatively complex internal structure and yet it is smaller than an element of the array, i.e. as small as a fraction of a millimeter. It is known to manufacture such minute mechanical parts.

(14) It is convenient to polarize the two bonded strips that constitute the column strip 40 uniformly along their whole length. With such a polarization, in order for the arms of the two bimorphs of an element to act in unison, it is necessary that the polarities of the voltage alternate on successive U bends. To allow for this, the metallizations 137 on the outside and tops of the U bends are connected alternatively to one or the other of two column buses 166A and 166B (See FIG. 14). The other connection is made through the horizontal metal supports 112.

(15) The soluble material 118 supporting the horizontal strips, which allowed the embossing of the vertical strip, is dissolved by immersing the whole array in water or in other suitable liquid (FIG. 12B).

FIG. 12A illustrates the row strip 42 in place over the soluble material 118. FIG. 12B illustrates a like view after dissolution of the soluble material 118. In FIGS. 12A, 12B and 12C, the column strip 40 and its supports are absent. FIG. 12C shows the same view as FIG. 12B when the row strip 42 is actuated by an applied voltage on its transparent electrodes 122, 123, to release the segment 135.

(16) FIG. 16 shows one way in which the display may be illuminated to provide the parallel incident light rays 34 from mirrors or reflectors 160 of parabolic cross-section after reflection from substantially linear sources 162, such as fluorescent tubes, for example, at the face of the reflectors 160. The row and columns are connected to the driving circuits.

G. Operation and Zero Velocity Stopping of the Vertical Segment

In the copending application above-identified, in operation of the bigrate it was shown that the vertical segment, when freed by the removal of the braking action of the horizontal strip, started an oscillation of period $T_v$. The oscillatory motion was arrested at precisely a quarter period later by restoring the braking action of the H-strip. At that instant the velocity of the segment was maximum. Braking at this moment of maximum velocity was necessary, as this was precisely the instant at which the segment had reached the desired position imposed by the video signal. At any other time the position of the segment is a function not only of the applied voltage but also of its previous position. That previous position was unknown. Operation may be performed as described in my prior above-identified application especially because the locking action would tend to rectify small errors in position when complex grating lines are used.

It would be desirable to brake the segment of the phase of its oscillation, half a period after release, when its velocity is zero. Braking at that phase can be made with greater tolerance in timing since the element is almost in its nominal position for a relatively long time. Also the possibility of damage or wear of the submicron-shaped complex wave stops is reduced or eliminated.

It turns out that braking at zero-velocity is relatively easy to achieve in the present arrangement. Here, as before, the position of the segment at its extremum of oscillation reached after half the period of oscillation depends on the applied voltage as well as the previous position. However the previous position is known to be one or the other of two well defined positions. The identity of which one it actually was can be stored in an auxilliary digital memory with a control 126 and associated digital memory 128 of a capacity and bits equal to the number of pixels (picture elements) in the display. The memory 128 and the control 126 may be parts of a digital mini-computer. The buses 166A and 166B may be ribbons passing between the U bends 134. The picture elements are at the intersections of the rows and columns, each intersecting transparent pairs of grating elements when aligned in one of the selected positions with the grating elements having maxima and minima respectively coincident with the maxima and minima of the other elements providing the least light transmission and in the other selected position, when the maxima and minima of one element are respectively coincident with the minima and maxima of the other element providing the maximum light transmission. By "coincident", in this sense, the reference is to coincidence along the direction at right angles to both the rows and columns.

There are two buses 166A and 166B for every column. These buses are connected to every other metalized surface 137, as illustrated in FIG. 14. For the sake of simplicity, the buses 166A and 166B associated with middle-column have been omitted. It is to be understood that there are two ribbons in each space between column 40.

Let V be the voltage required to statically (i.e. so slowly as to make inertial effects neglible) move the element 135 from its rest position of maximum transmission to its rest position of minimum transmission. The voltage V is also the voltage which causes an element to move dynamically between the position of maximum transmission to that of minimum transmission in a quarter period of natural oscillation. A bias voltage is applied to the column buses 166A and 166B of plus and minus $\frac{1}{2}$ V, say $+\frac{1}{2}$ V to bus 166A and $-\frac{1}{2}$ V to bus 166B. Under this condition, the segment 135 between adjacent bends 134, if released by its segment 42, will tend to assume a position midway between two extreme positions; (1) the initial rest positions of full light transmission and (2) a position in which peaks correspond to peaks and valleys to valleys of least light transmission. It does not matter that one segment moves in one direction and the next the other, (say, up or down) since there are stable positions in either case, because the proposed "stops" or complex waves are symmetric in either direction.

Before applying video signals the device is set into a standard state, erasing any patterns that might have been left in it from previous use or otherwise. This initiation period starts by unlocking all rows, thus freeing all elements of the array, and applying no bias or other voltages on the 166A and 166B column buses (i.e. zero voltages on all columns). All elements will assume a position corresponding to no stress on the bimorphs, i.e. the position they had during embossing. The elements which had that rest position already will simply not move. Those which had the opposite position will oscillate about the position of no-stress. The oscillation will be dampened by the repeated flexing of the plastic and the presence of air. After a fraction of a second the damping will bring the elements to rest. Hence all elements will be brought to a position of full transmission, a position that will be designated as binary "0". The least transmission position is, of course, designated binary "1". At that time, all the rows are deenergized and lock all elements in their standard "0" position. The device is now ready to receive video signals.

Let a selected row line be released. In a first case, the video signal calls for maximum light transmission at a selected segment of the line, and comparison with the stored element in the memory indicates that the element is already in this position, a voltage of $-\frac{1}{2}$ V is applied to the adjacent 166A bus lines and $+\frac{1}{2}$ V to the adjacent 166B line. The resultant voltage is zero on both A and B lines and the selected element does not move.

In a second case, if a comparison with the corresponding memory element shows that the video calls for minimal light transmission, and the selected segment 135A was already at the state, a voltage is applied, of $+\frac{1}{2}$ V to the A line and of $-\frac{1}{2}$ V to the B line. The resultant voltage on 166A is $+V$ and on 166B is $-V$, which thus applies by definition of V the force required to keep one element in the state of minimum transmission. Therefore, the selected segment 135 remains with no change in the minimal light transmission state.

At this point it may be noted that the bias voltage of $+\frac{1}{2}$ V and $-\frac{1}{2}$ V on the respective lines 166A and 166B applies a force on the selected segment which has precisely the right value necessary to bring that element in half period of oscillation from whichever of the two positions of maximum or minimum transmission it happened to be in to the other such position. Indeed, after a quarter period the element will have reached the neutral position between maximum and minimum transmisson where it has its maximum velocity. From there on, its kinetic energy will bring it to the other position which it will reach with precisely zero velocity. (This mode of operation was explained previously in general terms. It is spelled out here for clarity and to show how the bias provides the ½ V force.)

In a third case, if the video for the selected segment 135 calls for minimal light transmission and the element as indicted by comparison with the corresponding memory element was in the maximum transmission state, no voltage need be applied to the buses 166A and 166B. Their bias urges the selected segment 135 toward the neutral position, half-way between the two extreme positions which is reached after a quarter period. The element continues by inertia and after a half period of oscillation, it will reach the other extreme position in which, as desired, the element is located for minimal light transmission.

In the fourth case, if the video for the selected segment 135 calls for maximum light transmission, binary state "0" and the corresponding memory element was in the opposite binary state "1" indicating that the segment 135 was last in the minimum light transmission state, no voltage is applied to the buses or lines 166A and 166B. The segment 135 as soon as released is urged toward the neutral position and its kinetic energy carries it through that position to the other extreme, or maximum light transmission position in a half period of oscillation.

After the half period of oscillation, the selected row element signal is applied to lock all the elements 135 of the selected row in the new position, and the corresponding elements of the memory will be addressed to assume corresponding states. It will be recognized that the digital memory has to have a capacity in bits at least equal to the number of elements in the display, and that the address of each bit in the memory corresponds uniquely to an element of the array as identified by its row and column. If a picture element state is changed from one state to the other, the corresponding binary digit or bit of the memory is now likewise changed.

The following table summarizes the operation for a single element.

| Old State (also Memory) | Video Calls For | Signal Applied To: 166A | 166B | Total V at 166A | 166B |
|---|---|---|---|---|---|
| 0 | 0 | $-\frac{1}{2}V$ | $+\frac{1}{2}V$ | 0 | 0 |
| 1 | 1 | $+\frac{1}{2}V$ | $-\frac{1}{2}V$ | $+V$ | $-V$ |
| 0 | 1 | 0 | 0 | $+\frac{1}{2}V$ | $-\frac{1}{2}V$ |
| 1 | 0 | 0 | 0 | $+\frac{1}{2}V$ | $-\frac{1}{2}V$ |

In this table, a binary 0 in the first column corresponds to the initial stae of maximum light transmission and a corresponding arbitrary state of the corresponding memory location element. The opposite state is represented by a binary 1. To change states, no voltage is applied other than the bias voltage to the buses 166A and 166B.

In summary, to set a selected segment, the corresponding row of memory is addressed, and all the columns of the memory are interrogated. The binary value of the recovered stored binary digits of each column of the selected row are compared with the video signal for each column, in separate comparison circuits (not shown) which may be in the computer 126. Then each column 166A and 166B of the display is signaled in accordance with the table. Recall that only the selected row elements 135 may move. After one half period of oscillation, the selected row signal is removed, the elements are locked, and the selected line has the new video signals stored. At the same time, the selected memory row is changed if a change has been called for as indicated in the last two columns of the table. Hence, the memory element states always correspond to a display element state except during a change.

H. Comparison Between Quarter and Half Wave Operations

Under the mode of operation just described, switching from max to min transmissions or vice-versa is accomplished in half the natural period of oscillation of the segments. The mode, described in my copending patent application, in which that switching occurs in quarter of the period is possible also with the on-off black and white display of interest here. The switching in half period requires only half the voltage drive required for switching in the quarter period. In many applications economy of drive is more important than speed. However, should this not be the case, the switching can be speeded up by shortening the lengths of the bimorphs and thereby the period of oscillation itself. Of course the driving voltage has to increase accordingly. It turns out that the increase is relatively small. When the voltage V used at quarter-wave-arrest is also used at half-wave-arrest, the switching time is increased by only about 20%.

I. Frame and Latent Storage

An important feature of bigrate displays, is their ability to store a frame. The storage has no decaying characteristic as does for example the exponentially decaying storage of phosphors in CRT's. All elements are locked in and stay that way until deliberately switched. The display exhibits also latent storage, i.e. if left non-energized for any length of time, when energized again, it will exhibit the image last recorded.

These features of frame and latent storage exist also in the bigrate displays described in my copending patent application and were described in that application. These features are particularly important in a black-and-white on-off display, as it is often very useful to retain an alpha-numeric text or a graph for very long periods of time.

J. Result of some Computations (a) sum of amplitudes

It may be shown that a bigrate, whether of the sine wave variety or of the square variety disclosed in my copending application identified above, with its two juxtaposed gratings acts as a single grating having an amplitude equal to the sum of the amplitudes of its constituent gratings. Here, amplitude means the height of the surface profile as it varies along a direction perpendicular to the grating lines.

It may further be shown that a bigrate with square wave gratings has excellent gray-scale or analog control properties.

The equations show that for sine wave gratings, neutral gray transmission of white light is obtained only for the positions producing minimum lignt transmission or full light transmission, at which there is essentially no grating.

In these considerations, as indeed in the very principle of the bigrate, it is assumed that the light does not loose its phase coherence as it passes through the bigrate. For this to be true the spacing between the two gratings of the bigrate cannot be too large, preferably smaller that a few periods of the gratings, as was already mentioned in the aforesaid application. A spacing of far less than a period is guaranteed when the complex wave steps described herein are used (See FIG. 5). Also there are limits on the collimation of the light, although it was already shown that these are relatively large ($\pm 20°$).

(b) Period of oscillation and value of drive—Tolerances

The period of oscillation of the bimorphs with the appended segments 135 depends on the length L of the arm from its attachment to the bonding metal 114 to the end of the U arm adjacent the movable segment 135, the masses to be moved, and the elastic properties of the bimorph strips. The length L can be chosen, by simple computations, for example, by using the relations of my copending application so that the period of oscillation has a desired value. Similarly, the stroke or length of motion of the segment 135 depends on the piezoelectric properties of the bimorph the thickness and length of the bimorph and the applied voltage V. Using the computations and relations of my copending application, one may compute the value of V which will produce a length of motion equal to the distance between the selected positions of maximum and minimum transmission, i.e. half the gratings periodicity or square root of two times that periodicity as the case may be. As heretofore noted in one of these selected positions, the facing gratings are coincident maxima to maxima, and minima to minima, and in the other selected position, the facing gratings are maxima to minimia and minima to maxima. Instead of computing the value of V it is possible to determine it experimentally after the display has been built with whatever elastic and piezoelectric properties the bimorphs happen to have and with thickness and length of arms with which they were constructed.

If the elastic and piezoelectric properties, as well as thicknesses and arm lengths, of all bimorphs in the array were exactly equal, then the period of oscillation and the displacement for a given driving voltage would be exactly the same for all elements of the display. In practice, there will be deviations from the nominal values in material parameters as well as geometrical dimensions. Consequently, for a given freedom time of the segments, between unlocking and locking, and a given drive, the segments will, in general, not reach precisely their nominal positions of maximum and minimum transmission. However because of the nature of the complex stops the segments will reach these nominal values, during locking, as long as the deviations from their nominal positions are not too great. Indeed the two stable positions are determined by the engagement of peaks on one strip into troughs on the other. There are two such stable positions. The two engaging troughs are separated by a peak, about half way between them (actually the interval is divided into 43% and 57% segments, note curves FIG. 5). When the peaks of one strip strike the other at some position within the desired troughs, they will slide into these troughs during the locking operation. Consequently, the nominal value has to be reached only within + or −43% of the grating periodicity. This large tolerance, is, of course, partly a result of the digital on-off mode of operation and partly the use of the complex waves as stops.

K. Black and White Display Using Rectangular Gratings

A black and white display having gray scale can be made using rectangular gratings. (With sinusoidal gratings only on-off operation is possible).

Although a black and white light valve could be made out of three separate superimposed color bigrates of appropriate color primaries, a better solution is to emboss three primary color square wave bigrates in two respectively movable transparent sheets or strips which may replace strips 40, 42 in the array. The three square wave gratings providing subtractive primaries, can be used in tandem or else can be superimposed on the same surface of each bigrate as long as the grating lines of the three gratings are at an angle of 120° (60°) to each other (as illustrated in the partial, much enlarged, schematic view of FIG. 17) on the column element 40' to replace element 40. The relative motion is indicated by the double-headed arrow. The complex wave stop is as before near the centerline of the element and therefore is not shown in this partial view. Consider for example the three gratings at 60° to each other and the motion of one supporting sheet with respect to the other perpendicular to the lines (shown horizontal in FIG. 17) of one of the gratings. If the periods k of the other two gratings are half the period 2k of the first, and the amplitudes of the three gratings are respectively $a_1 = 610$ nm, $a_2 = 780$ nm, and $a_3 = 935$ nm, a panchromatic light modulation will result from the three bigrates as the two sheets are moved with respect to each other. The lines are much enlarged in FIG. 17 to show better the angular relations. Also, with these spacings and if the gratings parallel to the rows are appropriately arranged relative to the other and are moved relative to each other perpendicularly to the rows, as above described, then when these gratings face peak to peak, so will the other two pairs, and when peak to valley, so will the other two.

In this fashion, a black and white display with good neutral gray scale can be made from a single array of light valves with three gratings. The light valves are created at the intersections of vertical and horizontal plastic transparent strips. The strips are embossed each with three square wave gratings of primary amplitudes. The gratings lines are at 60° with respect to one another, and one set of lines parallel to the grating lines may be parallel to the rows and have a periodicity double that of the other two. Otherwise the vertical lines and the horizontal lines are shaped and operate as was described before.

L. Digital Control of Gray Scale

Digital control of gray scale in displays may be desirable because it insures accurate rendition despite many possible manipulations and distortions to which the video signal may be subjected in transmission, amplification, etc.

On-off bigrates are particularly suitable to implement digital control of gray scale, that is, the control of transmission in accordance with the n binary signals that encode $2^n$ values of the video signal. For good rendition a minimum of $n=5$ but preferably $n=8$ are required.

The control may be achieved by having at each picture element of the display n light valves rather than a single one. The first gate controls half of the element's area, the second controls a quarter of the area, the third an eighth, etc. finally the nth valve controls the $\frac{1}{2^n}$ of the area. The total transmission at this picture element is then proportional to the digital binary value of the video signal. Each such picture element may be considered as made up of a series of picture elements of differing size.

In the actual implementation of an array of elements in a display, n vertical strips rather than a single one, may be used in each column. The widths of the n lines are respectively $\frac{1}{2}$, $\frac{1}{4}$, $\frac{1}{8}$, 1/16 ... $\frac{1}{2}^n$ the width of the picture element. In order for the strips corresponding to the last few less significant digits not to be too narrow and hence typically too difficult to handle, wider strips can be used with an appropriate portion of the width masked. The unmasked part has the width necessary for control.

Each strip carries the same periodicity grating and is displaced by the same amount, that is, a half of the period (or square root of two times half the period, as the case may be) and thereby results in no or full transmission of the corresponding part of the element. Complex wave stops are used as in bigrates previously described. The horizontal line stops each vertical strip at a position dictated by the video digit in a manner described before.

The gratings and complex wave stops in the n vertical strips are embossed from the horizontal strip in an operation identical to the one described for a single vertical strip.

For black-and-white, two orthogonally crossed sine wave gratings of appropriate amplitudes and oriented at 45° with respect to the length of the strips are the preferred choice as was explained before. Single sinewave gratings with horizontal lines can be used also. Alternatively three rectangular gratings with lines at 120° to each other and amplitudes corresponding to substractive primary colors can be used also. In any case the n-strips at each position move in a manner analogous to the movement of the one strip in an on-off control mode.

For color three arrays with rectangular gratings and horizontal grating lines are used. Three amplitudes of the rectangular gratings in the three arrays are respectively the ones corresponding to substantive primary colors. There are n strips at each element with widths in the binary ratios, $\frac{1}{2}$, $\frac{1}{4}$ etc. $\frac{1}{2}^n$.

M. Summary and Conclusion

The bigrate is a light valve for controlling the transmission of light that needs to be neither coherent, polarized or well collimated. Depending on its construction, the bigrate can operate over a wide band of light frequencies, or also over a relatively narrow band. The control is exercised by a low voltage. The valve behaves as a pure capacitance, hence it requires only reactive power. Switching times are of the order of tens of microseconds. In comparison to Kerr or Faraday light valves, the bigrate is much simpler, does not require polarizers and analyzers, requires much less control power, and is more tolerant to imperfect collimation, although it may be slower. It has in addition unique storage properties in that it can be locked into any desired transmission level.

Bigrates are ideal for use in arrays. Array of bigrates can be fabricated by using row and column plastic strips or ribbons. The bigrates appear automatically at the intersections and provide thereby discrete light valves without having to actually make distinct discrete elements. Their locking properties allow addressing the array by rows and columns i.e. matrix x-y addressing. In addition, there is non-decaying frame storage as well as latent storage. The array of bigrates is flat, very thin, and very light in weight. The construction is very simple. No envelop for vacuum or special gas is required. It can be built in very large size, providing a "picture on the wall". No other technology can provide such large matrix addressed displays (non-projected). Smaller sizes are possible also.

Although based on mechanical motion, switching times of bigrates are sufficiently short to allow line-addressed television. This high speed results from the fact that the motion is only over about a micron and that the moving mass is very small.

Black and white displays can be made with a single array of bigrates and color displays can be made with three superimposed arrays.

For analog or grey-scale operation, the elastic and piezoelectric properties of the plastic ribbons as well as all geometrical dimensions must be uniform within relatively small tolerances. Adequate operation is obtained, despite deviations from these tolerances, by adjusting each element separately by a servo operation. One such servo method of construction was described in my copending patent application.

For digital operation, i.e. on-off operation, the tolerances are much greater. This is particularly true when the complex wave stops described in this patent application are used. As a result, the construction is much simpler. Servoed adjustments of elements is not necessary.

In the case of black-and-white operated in an on-off mode it is particularly advantageous to use two crossed sinusoidal gratings on the bigrates, as an exceptionally high contrast results.

In conclusion, the black-and-white display described herewith has the many advantages of bigrate displays described in my previous application, and in addition, it is much simpler to construct, particularly when using imperfectly uniform materials, and it provides images of exceptionally high contrast.

What is claimed is:

1. A light valve comprising a pair of transparent sheets in close juxtaposition to each other, each sheet carrying on the side facing the other sheet two or more surface relief phase gratings, said gratings on each sheet being superimposed on each other with lines of any one grating making an angle to the lines of the others of the same sheet, and said gratings having like periodicity and identically oriented with the lines on one sheet being parallel to the lines of the other.

2. A light valve as claimed in claim 1, and means for moving one said sheet relative to the other in a direction such that the zero order diffraction transmissions through each pair of gratings that have parallel lines facing each other on the two said sheets, vary in unison.

3. A light valve as claimed in claim 2, each said sheet carrying two sinusoidal relief surface phase gratings perpendicular to each other said two gratings on the same sheet having lines spaced with the same periodicity, and said direction being at 45° to said lines.

4. A light valve as claimed in claim 3, the amplitudes of the sinusoidal relief phase gratings of one sheet being different from each other and of such values as to provide, at the relative position of the said two sheets corresponding to the minimal zero order diffraction transmission of the light valve, a minimal zero order diffraction transmission for as wide a band of light frequencies as is possible.

5. A light valve as claimed in claim 2, operated to provide maximum or minimum light transmission, in which each of the two said sheets carries two sinusoidal relief phase gratings, said two gratings having lines spaced with same periodicity, each said two gratings having lines perpendicular to each other, said direction being at 45° to said lines, and said motion being in an interval equal to the square root of two times said periodicity.

6. A light valve as claimed in claim 4, said values of the two gratings peak-to-peak amplitudes being respectively 450 and 790 nanometers.

7. A light valve as claimed in claim 2, each side of the two sheets facing each other carrying identical triplets of rectangular surface relief phase gratings said triplets consisting in three superimposed gratings with equilaterally oriented lines at 60° to each other, having each a different amplitude, two of which having the same periodicity and the third twice the said periodicity and means for moving said sheet relative to each other in a direction perpendicular to the lines of said third gratings in order to control panchromatically the zero order diffraction transmission through said light valve.

8. A light valve as claimed in claim 7, in which the said peak-to-peak amplitudes of the three rectangular gratings of each side are respectively 610, 780 and 935 nanometers.

9. A light valve comprising two closely juxtaposed sheets each carrying on the side facing the other a surface relief phase grating pattern identical with the other of said patterns, and means for moving said sheets relative to one another in such a direction as to vary the total transmission of light through said light valve, and means to insure two definite relative positions of said sheets, one said position providing maximum light transmission and the other minimum light transmission.

10. A light valve as claimed in claim 9, said grating pattern comprising a single grating.

11. A light valve as claimed in claim 9, said pattern being the superposition of more than one grating pattern.

12. A light valve as claimed in claim 9, said means for insuring two definite relative positions of the two sheets comprising in providing, on the sides of the sheets facing each other, in addition to the gratings, surface reliefs that afford two and only two stable positions of the two sheets at one or the other of two said definite positions when the surfaces are forced together.

13. A light valve as claimed in claim 12, said additional surface reliefs having matching shapes on the two sheets, such that the combined profile of the gratings and the additional reliefs on one sheet are embossed from the other sheet simultaneously, said two stable positions of the sheets affording respectively, maximum and minimum transmission.

14. A light valve as claimed in claim 13, said additional surfaces consisting of a staircase shape on each side of the grating to serve as stops, each said staircase having three steps the second step having a width equal to the separation between the relative positions of the sheets corresponding to maximum and minimum transmissions and the height between the first and second steps being greater than twice the peak-to-peak amplitude of the gratings.

15. A light valve as claimed in claim 13, said additional surface on the first sheet from which embossing is made on the second sheet, consisting in a periodic complex wave having alternating maxima of relatively large and relatively small amplitudes, separated by minima of equal amplitudes, the difference between the maxima of said amplitudes being no less than twice the peak-to-peak amplitude of the gratings, the spacing between any relatively large maximum and an adjacent relatively small maximum being equal to the difference between the relative positions of the two sheets corresponding to maximum and minimum light transmission.

16. A light valve as claimed in claim 15, means for relatively positioning the two sheets either in a position for maximum transmission said position being that existing at the time of embossing or in the position for minimum light transmission obtained by butting one sheet against the other so that the relatively large maxima of the first sheet engage the relatively shallow grooves in the second sheet that were embossed by the relatively small maxima of the first sheet.

17. A light valve as claimed in claim 15, said complex wave being defined by its height y as a function of the distance x in the direction of relative motion from a selected point by the equation $$y = (m \cos \beta + \cos 2\beta)^2$$

where $\beta$ equals $2\pi x/r$ and r is twice the distance between the relative positions of the two sheets corresponding to maximum and minimum light transmission and m is a number no less than 3.

18. A light valve as claimed in claim 17, in which $m = 5$.

19. A light valve as claimed in claim 15, said additional surface occupying a total area small compared to the area occupied by the light controlling gratings, said complex waves being positioned either on the sides of the light controlling area or in a location bisecting that area.

20. An array of light valves as claimed in claim 9, said array being arranged in rows and columns, said valves being created at the intersection of row and column by means of transparent strips extending respectively the full row and column lengths, said one of the juxtaposed sheets of each valve being a part of the row strip, said other one of the juxtaposed sheets of each valve being a straight segment part of the column strip, and said column strip consisting of a serpentine shape with said segments alternating with U bends, said U bends being all on the same side of said segments.

21. An array of light valves as claimed in claim 20, said row and column strips being mounted on a transparent support plate said plate carrying metal strips embedded at right angle to its surface, said row lines being located between said metal strips and being bonded to the support plate at intervals between consecutive column strips, said column strips being mounted with the U bends fitting over said metal strips and the middle portions of the sides of said U bends being bonded to said metal strips.

22. An array of light valves as claimed in claim 21, each of said column strips comprising two bonded oppositely polarized plastic ribbons of piezoelectric properties to form bilayer ribbons, each said bilayer ribbon being metalized inside and outside at the locations of its U bends, said inside metallizations of each U bend being connected to said horizontal metal strips, said outside metallizations of each U bend being alternately connected to two bus conductors of a push-pull pair.

23. In an array of light valves as claimed in claim 20, said array having column lines with U bends all on the same side of the straight segments, means for causing the arms of said U bends to be a pair of two piezoelectric bimorphs with common electrodes and means for energizing all the U bends pairs of bimorphs on a column strip so that the two bimorphs acting on each straight segment and belonging to two adjacent U bends, act in unison to move the said segment in the same direction.

24. In an array of light valves as claimed in claim 21, said row strips being plastic ribbons carrying on their side opposite the supporting plate, phase grating and stopping surface profiles, means to emboss said profiles on the column strip segments, said means including the use of a supporting layer between the supporting plate and said row strips, said supporting layer being subject to dissolution after embossing.

25. In an array of light valves as claimed in claim 22, a method for applying signals to said push-pull column buses so as to lock said column strip segments into one or the other of two definite positions as selected by a video digital signal.

26. In an array of light valves as claimed in claim 20, a method for generating signals on the columns of the array, said method including the steps of comparing the initial transmission of a light valve of the array as identified by the stored bit in an auxilliary electronic memory at the address corresponding to said valve with the final transmission as defined by a value of a video signal, of logic switching between said bit and video signals, and applying the signals resulting from said logic switching to the columns of said array.

27. A method for locking, into a chosen one of two well defined positions, a light valve element subject to sinusoidally oscillating motion in response to a restoring force at a point of near or zero velocity comprising the steps of releasing the element from the initial one or the other of said well defined positions and then subjecting the element to a locking force substantially at half period of said motion after said releasing.

28. A method for locking into a chosen one of two well defined positions an element in each of a plurality of light valves arrayed in rows and columns, each of the light valve elements being subject to sinusoidally oscillating motion in response to a restoring force at a point of near zero or zero velocity comprising the successive steps of the method as claimed in claim 27 applied successively to elements of the array.

29. A method as claimed in claim 28, comprising the further steps of comparing the initial position of an element of the array as identified by a stored bit in an auxilliary electronic memory at the address corresponding to said element with the chosen final position as identified by an electrical signal.

30. A light valve comprising a pair of light transmissive elements each having a major face, said face of one element close to and facing the other major face, said faces respectively having phase gratings of like periodicity and each said face having grating lines parallel to the grating lines of the other said face of the pair, said elements being movable with respect to the other for selectively positioning said elements in one of two positions, in one of which positions the lines of one said face have their maxima and minima respectively coincident with the maxima and minima of the other said face, and in the other position the maxima and minima of one said face are coincident respectively with the minima and maxima of the other said face.

31. A light valve as claimed in claim 30, said gratings each being sinusoidal phase gratings.

32. A light valve as claimed in claim 31, each of said faces having transversely crossed grating lines.

33. A light valve as claimed in claim 32, said transverse grating lines crossing at right angles to each other.

34. A light valve as claimed in claim 31, said selective positioning means including stops formed in said elements.

35. A light valve as claimed in claim 33, said selective positioning means including means for moving one of said elements with respect to the other in a direction at 45° to the grating lines of both elements.

36. A light valve as claimed in claim 31, the grating lines on one of said elements being embossed from the grating lines on the other said element.

37. A light valve as claimed in claim 31, said selective positioning means including complex grating lines on said faces, the complex grating lines on one of said faces being complementary to the complex grating lines on the other said face.

38. A valve as claimed in claim 37, each complex wave corresponding to the equation:

$$y = (m \cos \beta + \cos 2\beta)^2$$

where $y$=depth of the complex wave, and $\beta = 2\pi x/r$, where x is the distance in the direction of motion from a selected point, r is the distance between the selected positions, and m is a number no less than 3.

39. A method of providing a display of light and dark picture elements, said display comprising a plurality of pairs of light transmissive elements, each element of a pair having a major face close to and facing said major face of the other element of the same pair, said faces respectively having phase gratings of like periodicity and each face of a pair having grating lines parallel to the lines of the other face of the same pair, the steps of:
(a) selecting the picture elements of a dark and light display to be dark and other picture elements of said display to be light,
(b) moving the light transmissive elements of the pairs corresponding to the dark selected picture elements to positions with the maxima and minima of the lines of one element of each pair respectively coincident with the maxima and minima of the lines of the other light transmissive element of the same pair, and
(c) moving the light transmissive elements of the pairs corresponding to the light selected picture elements to positions with the maxima and minima of the lines of one element of each pair respectively coincident with the minima and maxima of the lines of the other light transmissive element of the same pair.

40. A display device comprising rows and columns defining at their intersections picture elements, each picture element comprising a pair of light transmissive elements, each element of a pair having a face with a phase grating close to and facing the face with the phase grating of the other element of the same pair and each face having grating lines of the same periodicity as and parallel to the grating lines of the other face of the same pair, and means for moving one of the elements of each pair with respect to the other for positioning the light transmissive elements of each pair selectively in either one of two positions, in one of said positions, the maxima and minima of the grating of the face of one of the pair coinciding respectively with the maxima and minima of the grating of the face of the other one of the same pair, and in the other one of said two positions the maxima and minima of the grating of the face of one of the pair coinciding respectively with the minima and maxima of the grating of the face of the other one of the same pair.

41. A method of operating a display device having horizontal and vertical lines defining at their intersections picture elements, each picture element comprising a pair of light transmissive elements, each element of a pair having a face with a phase grating close to and facing the face with the phase grating of the other light transmissive element of the same pair and each face having grating lines of the same periodicity as and parallel to the grating lines of the other face of the same pair, comprising the steps of:
   (a) positioning the light transmissive elements for light transmission by positioning the gratings of a pair with the maxima and minima of the face of one of the pair coinciding respectively with the minima and maxima of the other element of the same pair, and
   (b) positioning the light transmissive elements for relative non-transmission of light by positioning the gratings of a pair with the maxima and minima of the face of one of the pair coinciding respectively with the maxima and minima of the other element of the same pair.

42. A method as claimed in claim 41, said horizontal lines comprising polarized polyvinylchloride and contacts for each entire horizontal line, whereby one applied voltage to horizontal contacts causes the said polarized polyvinylchloride at each horizontal picture element to press against the other element of the same picture element to lock the elements in relative position, and a different voltage applied to said horizontal contacts causes said polyvinylchloride at each horizontal picture element to release the other element of the same picture element for positioning, said vertical lines comprising contacts for each vertical line for applying a pair of voltages to all the bimorphs of a vertical line, comprising the steps of:
   (a) applying said locking voltage to all the horizontal line contacts except a particular one and applying to the contacts of that one line a release voltage,
   (b) applying to the vertical contacts of each line successively voltages to cause the picture elements of said one horizontal line to be positioned by said bimorphs to one of two selected positions in one of which the maxima and minima of the grating lines of one element of a pair coincide respectively with the maxima and minima of the grating lines of the other element of the same pair and in the other selected position the maxima and minima of the grating lines of one element of a pair coincide respectively with the minima and maxima of the other pair,
   then applying a locking voltage to the said one particular horizontal line to lock in the selected positions the picture elements of the said one horizontal line.

43. A method as claimed in claim 42, respectively unlocking and locking the horizontal lines until each of the horizontal lines have been the particular one.

* * * * *